United States Patent
Toriumi

(10) Patent No.: US 8,305,620 B2
(45) Date of Patent: Nov. 6, 2012

(54) PRINT MANAGEMENT APPARATUS, PRINT MANAGEMENT SYSTEM AND PRINT MANAGEMENT METHOD WHICH USES JOB TICKETS

(75) Inventor: Takashi Toriumi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 243 days.

(21) Appl. No.: 12/824,581

(22) Filed: Jun. 28, 2010

(65) Prior Publication Data

US 2011/0002006 A1 Jan. 6, 2011

(30) Foreign Application Priority Data

Jul. 6, 2009 (JP) .................................. 2009-159954
May 20, 2010 (JP) .................................. 2010-116685

(51) Int. Cl.
*G06F 3/12* (2006.01)
(52) U.S. Cl. ...................................................... 358/1.15
(58) Field of Classification Search .................... None
See application file for complete search history.

(56) References Cited

U.S. PATENT DOCUMENTS

2007/0229881 A1* 10/2007 Matsubara et al. .......... 358/1.15

FOREIGN PATENT DOCUMENTS

JP 2007-156671 6/2007
JP 2009-59365 3/2009

* cited by examiner

*Primary Examiner* — Benny Q Tieu
*Assistant Examiner* — Jeremiah Bryar
(74) *Attorney, Agent, or Firm* — Oblon, Spivak, McClelland, Maier & Neustadt, L.L.P.

(57) ABSTRACT

A print management apparatus includes a writing-image processing unit and a job generation processing unit. The writing-image processing unit determines whether print data, to be printed using the print management apparatus, includes both color page and monochrome page, and generates writing-image data of the color page and writing-image data of the monochrome page from the print data. The job generation processing unit prepares a preliminary job ticket for printing the color page and a preliminary job ticket for printing the monochrome page based on an initial job ticket set for the print data when the writing-image processing unit determines that the writing-image data includes both color page and monochrome page.

12 Claims, 16 Drawing Sheets

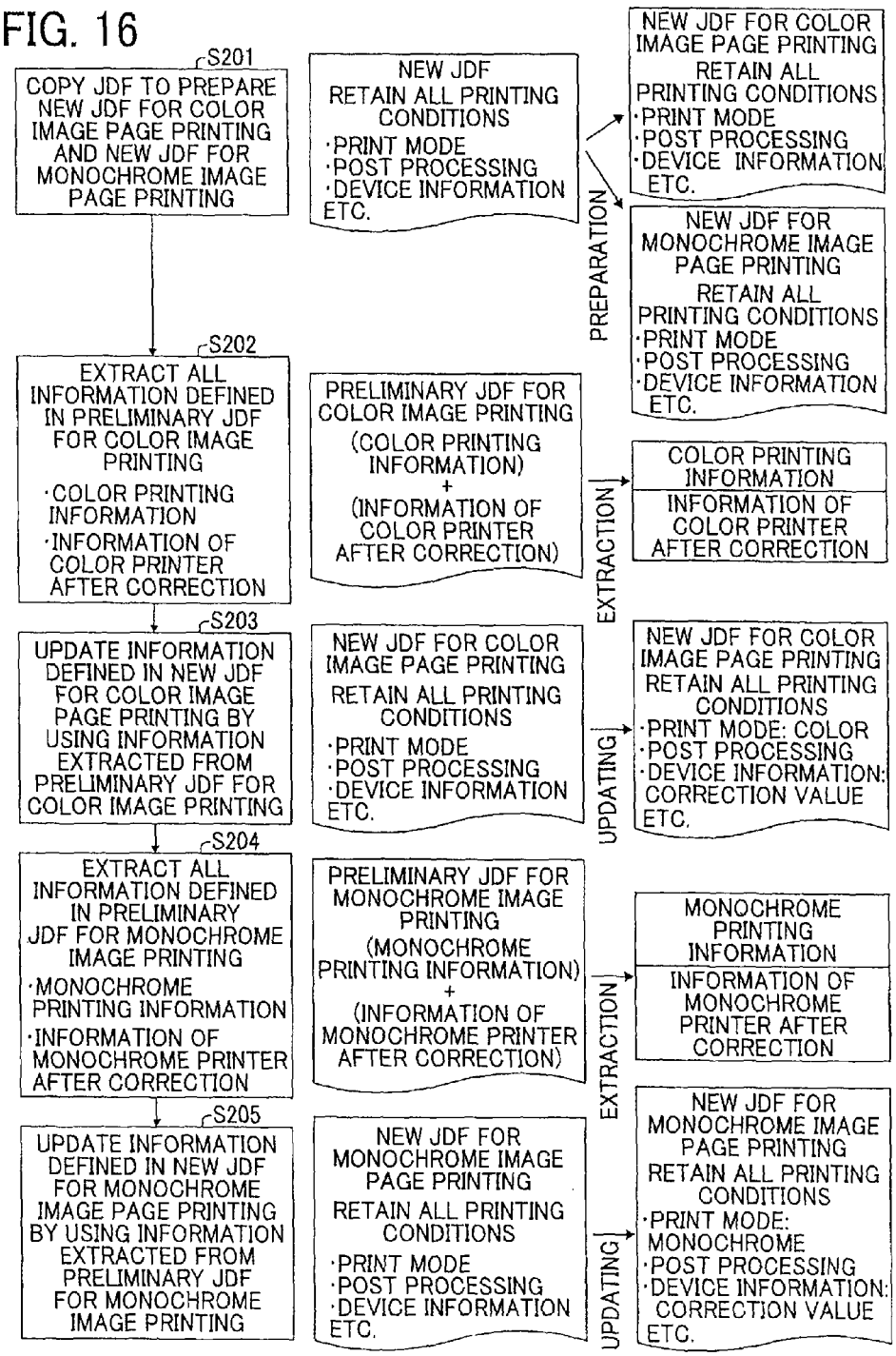

PRINT MANAGEMENT APPARATUS, PRINT MANAGEMENT SYSTEM AND PRINT MANAGEMENT METHOD WHICH USES JOB TICKETS

CROSS-REFERENCE TO RELATED APPLICATIONS

This application claims priority to Japanese Patent Applications Nos. 2009-159954, filed on Jul. 6, 2009 and 2010-116685, filed on May 20, 2010 in the Japan Patent Office, which are hereby incorporated by reference herein in their entirety.

BACKGROUND OF THE INVENTION

1. Field of the Invention

The present invention relates to a print management apparatus, print management system, and print management method, which uses a job ticket for conducting a printing operation.

2. Description of the Background Art

In general, printed products such as brochures are a mixture of color pages and monochrome pages. Such printed products can be printed by a single multicolor-printing printer. As such, a single printer can be used for a printing operation of such printed products having color and monochrome pages.

In commercial printing, printing companies often have monochrome printers that print only monochrome images. Accordingly, to make maximum use of these monochrome-printing-only printers, printing companies usually want to use multicolor-printing printers for printing color pages and monochrome-printing-only printers for printing monochrome pages.

Moreover, commercial printing, companies often conduct large-volume printing operations, in which printing companies may want to print a single printed product using two or more printers to avoid a heavy printing load at any one particular printer. Further, if a single printed product can be printed using two or more printers, total printing time can be shortened.

Also, in commercial printing, printers may be connected to devices or units that conduct post-print processing of the printed products, such as a punch-hole perforating process for perforating printed products with punch-holes, a staple-binding process for binding printed products using staples, and the like. Such a configuration for the entire production process, from printing by a printer to post-printing by a device unit, can be arranged to be conducted consecutively and seamlessly.

Further, with the advancement of network technology in commercial printing, the entire production process can be integrally managed by controlling electronic data transmission/reception between units, which may conduct a pre-printing process (pretreatment process), a printing process, and a post-printing process, for example. In such integrated management systems, operation instructions for the whole production process may be prepared as a job ticket, for which a job definition format (JDF), for example, may be used.

Although efficient, such integrated printing has drawbacks. For example, if one printed product is printed by two or more printers, the final product may show some variation from page to page in the way they are printed or processed, due to differences in settings between the two or more printers.

Usually, a client designates various printing conditions when placing a print order with a printing company. However, because the client assumes that the printing company may use a single printer and device unit for printing, the client may not designate some printing conditions and post-printing conditions, such as the positions of the punch-holes. If the printing company uses different punch-hole perforating device units having different settings, a single finished product may be composed of a mixture of pages having different punch-hole positions.

JP-2007-156671-A discloses one method to cope with such inconvenience when two or more printers are used for printing when the printers are switched part of the way through the printing. In JP-2007-156671-A, a first printer having first device information can be switched to a second printer having second device information during a printing operation to prevent differences in the finished product due to differences in device information between the first and second printers.

In the method of JP-2007-156671-A, before starting a printing operation with the second printer, the JDF is re-edited based on the second device information of the second printer so that differences in the finished product due to differences in device information between first and second printers can be prevented.

However, the method of JP-2007-156671-A contemplates switching printers if an error or malfunction occurs. Accordingly, such method is ineffective for printing print products having a mixture of color and monochrome pages because it may be necessary to switch printers several times. As such, printed products composed of a mixture of color and monochrome pages may not be effectively printed by the method of JP-2007-156671-A.

SUMMARY

In one aspect of illustrated embodiment, a print management apparatus is devised. The print management apparatus includes a writing-image processing unit and a job generation processing unit. The writing-image processing unit determines whether print data, to be printed using the print management apparatus, includes both color page and monochrome page, and generates writing-image data of the color page and writing-image data of the monochrome page from the print data. The job generation processing unit prepares a preliminary job ticket for printing the color page and a preliminary job ticket for printing the monochrome page based on an initial job ticket set for the print data when the writing-image processing unit determines that the writing-image data includes both color page and monochrome page.

In another aspect of illustrated embodiment, a print management system is devised. The print management system includes a job ticket controller, a workflow controller, a pre-press controller, and a printer controller to communicate information to control the print management system. The job ticket controller prepares a job ticket of print data, to be printed using the print management system. The pre-press controller includes a writing-image processing unit and a job generation processing unit. The writing-image processing unit determines whether print data, to be printed using the print management apparatus, includes both color page and monochrome page, and generates writing-image data of the color page and writing-image data of the monochrome page from the print data. The job generation processing unit prepares a preliminary job ticket for printing the color page and a preliminary job ticket for printing the monochrome page based on an initial job ticket set for the print data when the writing-image processing unit determines that the writing-image data includes both color page and monochrome page.

In still another aspect of illustrated embodiment, a print management method is devised. The print management method includes the steps of writing-image processing and job generation processing. The writing-image processing step determines whether print data, to be printed using the print management method, includes both of color page and monochrome page, and generating writing-image data of the color page and writing-image data of the monochrome page from the print data. The job generation processing prepares a preliminary job ticket for printing the color page and a preliminary job ticket for printing the monochrome page based on an initial job ticket set for the print data when the writing-image processing step determines that the writing-image data includes both of color page and monochrome page.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 16 illustrates an example process flow of preparing JDF using a print system according to an example embodiment.

Figure 1:
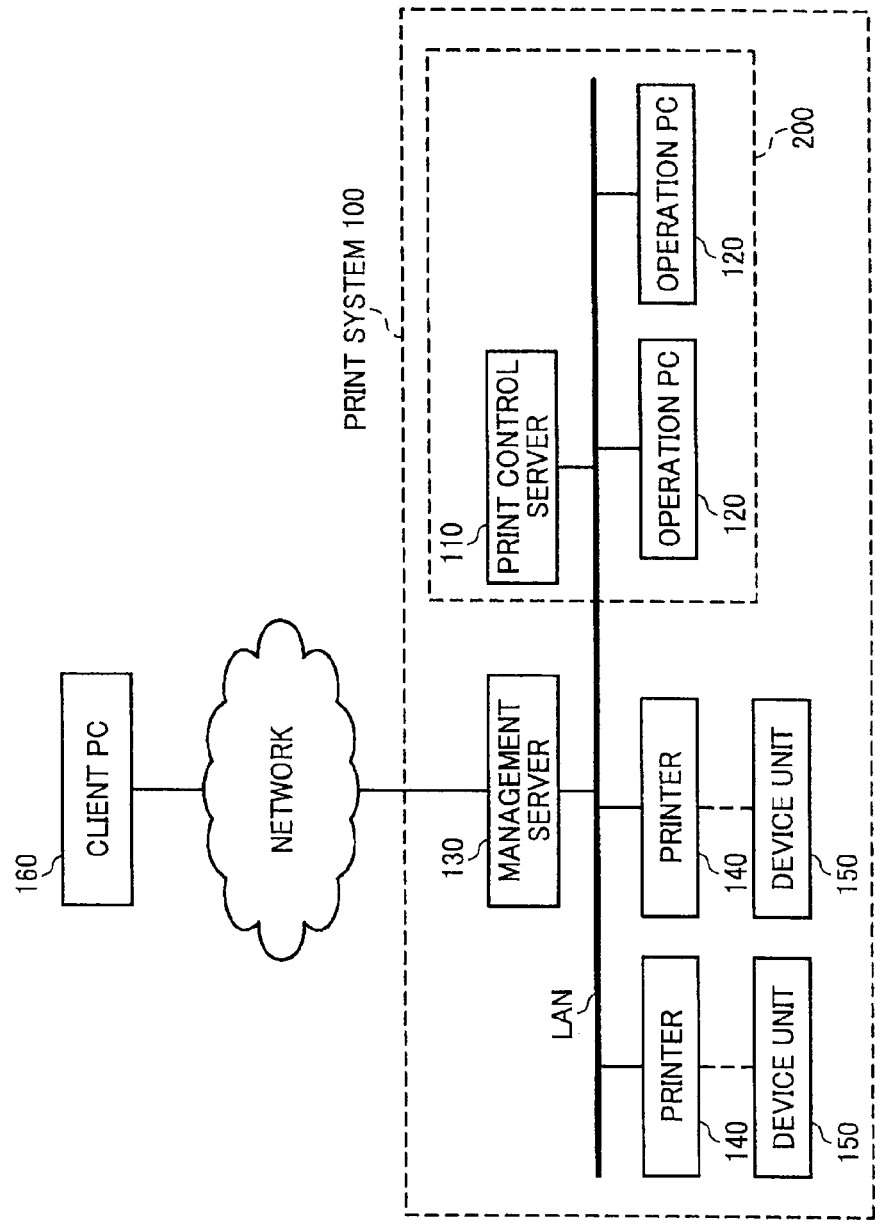
FIG. 1 illustrates an example configuration of a print system according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another element, component, region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner.

Referring now to the drawings, a print management system, a print management system, and a print management method according to example embodiments are described hereinafter with reference to drawings.

(Configuration of Print Management System)

FIG. 1 illustrates an example configuration of a print management system 100 according to an example embodiment. The print management system 100 may be configured with a print control server 110, an operation personal computer (PC) 120, a management server 130, a printer 140, and a device unit 150, for example. The print control server 110, the operation PC 120, the management server 130, the printer 140, and the device unit 150 may be connected with each other via a network such as local area network (LAN), for example. A printing service provider (e.g., print company) may use the print management system 100 to print products (e.g., brochure, catalog) ordered by a client.

In the print management system 100, the print control server 110 and the operation PC 120 may configure a print management system 200, which controls printing operations in the print management system 100.

The management server 130 receives print data and a print order request designating printing conditions from a client personal computer (PC) 160 via a network such as the Internet, for example. The management server 130 may be used for print management works for a print order request received from a client. For example, the management server 130 may manage print data reception, received print data, estimation of printing tasks, orders of print-finished products, and delivery of print-finished products. Further, the management server 130 may prepare a job ticket such as a job definition format (JDF), which defines printing conditions. Specifically, the management server 130 may prepare a JDF using a JDF preparation application or the like. The JDF is required in order to print a print-finished product with printing conditions designated by a client. Such JDF, which is prepared by the management server 130 when receiving the print data and printing conditions from the client, may be referred to as an initial JDF. The management server 130 transmits the prepared JDF and the print data received from a client to the print control server 110. The print data may be used to print a given print product (e.g., brochure, catalog).

The management server 103 may preferably have a function similar to a management server called as a management information system (MIS), for example. The management server 130 may be implemented using one unit or two units, for example. In case of using two units, processing functions can be distributed between two units, in which one unit may be used as a server for the above described management processing and other unit may be used as a server for the above described JDF preparation processing.

The printer 140 conducts a printing operation designated by a print job. The printer 140 is connected to the device unit 150.

When the printer 140 conducts a printing operation designated by the print job, the device unit 150 may be used for the printing operation and/or post-printing process step conductable after the printing operation. For example, such post-printing processing conductable by the device unit 150 may include a punch-hole perforating process for printed products, a staple-binding process for printed products, or the like. The print management system 100 may include the printer 140 with a plurality of numbers. The device unit 150 may be connected to a LAN or the like. If the device unit 150 is connected to a LAN, the device unit 150 can communicate information with other units directly via the LAN. If the device unit 150 is not connected to a LAN, the device unit 150 may communicate information with other units via the printer 140 connected to the device unit 150.

(Configuration of Print Management System)

Figure 2:
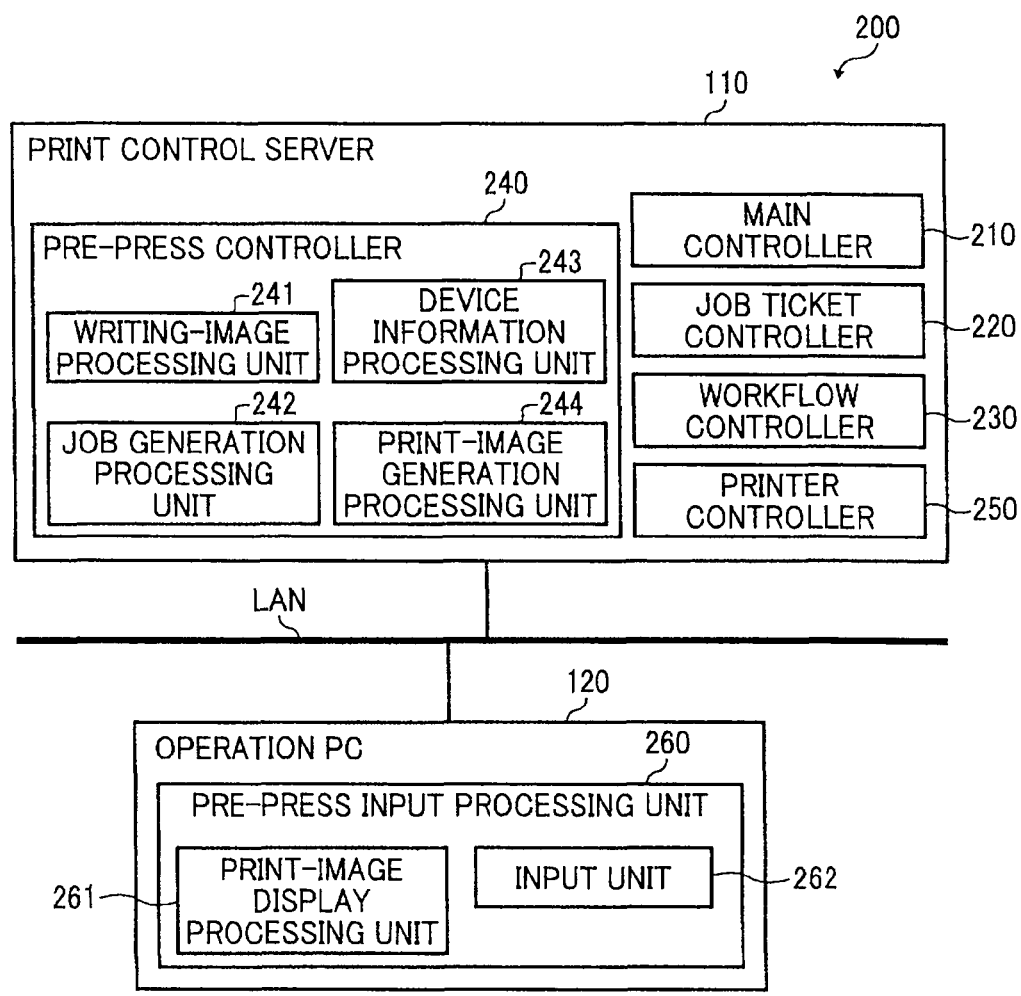
FIG. 2 illustrates an example configuration of a print management system according to an example embodiment.

FIG. 2 illustrates an example configuration of the print management system 200. The print management system 200 may be implemented using the print control server 110, and the operation PC 120, for example.

(Configuration of Print Control Server)

The print control server 110 may be configured using a main controller 210, a job ticket controller 220, a workflow controller 230, a pre-press controller 240, and a printer controller 250, for example.

The main controller 210 issues process instructions to units in the print management system 200 for conducting various processes, and receives results of conducted processes from the units to manage and/or control the print management system 200 as a whole. The main controller 210 may retain print system management information, which is used to manage and/or control each unit configuring the print system 100. Specifically, the print system management information may include a list of color printers adapted to color printing process; a list of monochrome printers adapted to monochrome printing process; the number of host units connected to the LAN; location of processing unit in such host unit, or the like. The main controller 210 controls the print management system 200 using the print system management information.

The job ticket controller 220 analyzes printing conditions at each print process step defined by the JDF transmitted from the management server 130. When it is determined that the printing system 100 is capable of printing print data based on an analysis result, the job ticket controller 220 transmits the JDF and a workflow generation instruction matched to the JDF defined-conditions to the workflow controller 230.

As described later, an operator may change printing conditions set for pre-press processing, print processing, and/or post-print processing, for example. When such printing condition change is made, the job ticket controller 220 edits contents (or conditions) defined in JDF to change printing conditions and re-prepares a JDF based on the changed printing conditions. Then, the job ticket controller 220 transmits the re-prepared JDF to the workflow controller 230.

Based on the JDF-defined conditions transmitted from the job ticket controller 220, the workflow controller 230 generates a workflow, which links a plurality of process steps to be conducted in a given sequential order. Such process steps may include a step of receiving print data, a step of producing print-finished products, and the like. Further, based on the generated workflow, the workflow controller 230 controls conditions at each process step, and issues print-related instructions at each process step. For example, when print data is received, the workflow controller 230 instructs a pre-press processing to the pre-press controller 240 to complete the reception of print data.

Further, the workflow controller 230 may have a function of reporting a status at each process step to an operator. Further, to be described later, the workflow controller 230 re-edits a workflow to regenerate the workflow when some change is made to the printing process. The workflow controller 230 may manage process status at each process step, and display the process status at each process step.

The pre-press controller 240 may be configured with a writing-image processing unit 241, a job generation processing unit 242, a device information processing unit 243, and a print-image generation processing unit 244, for example.

The writing-image processing unit 241 determines whether writing-image data of print data, transmitted from the management server 130, includes both color and monochrome pages, and generates writing-image data for color pages only, writing-image data for monochrome pages only, or both writing-image data for color pages and writing-image data for monochrome pages depending on determination results.

The job generation processing unit 242 receives the JDF from the workflow controller 230, and converts the writing-image data generated by the writing-image processing unit 241 into a data format that can be processed by the printer 140 to generate a print job.

In the print management system 100, the device information processing unit 243 requests operation information of printer 140 and operation information of device unit 150, which may be referred to as "device information" to the printer controller 250. The device information is information indicating what operation is operable by each device unit 150 when a printing process is conducted. For example, the device information may be punch-hole perforating position in printed products at a post-printing process step.

The print-image generation processing unit 244 may generate a virtual print image using JDF-defined printing conditions transmitted from the workflow controller 230, the writing-image data generated by the writing-image processing unit 241, and the device information of device unit 150 obtained by the device information processing unit 243. Specifically, the print-image generation processing unit 244 applies the JDF-defined printing conditions and treatment results of device unit 150 conductable at a post-printing process step to the writing-image data to generate a virtual print image, by which to-be-printed image including the treatment result of device unit 150 can be produced. Further, the print-image generation processing unit 244 transmits the generated virtual print image and the device information of device unit 150 to the operation PC 120. As such, the virtual print image is displayed showing actual print conditions before actually printing images using a printer.

The printer controller 250 controls the printer 140 using the JDF-defined printing conditions transmitted from the workflow controller 230 to print a print job transmitted from the pre-press controller 240 at the printer 140. For example, based on the JDF-defined printing conditions, the printer controller 250 controls operations of the printer 140 to conduct single-sided printing or duplex printing at the printer 140. Further, the printer controller 250 conducts a recovery process when error or trouble occurs during a printing operation, for example.

Further, based on a demand or request from the pre-press controller 240, the printer controller 250 obtains operation information of printer 140 connected to the print management system 100, and operation information (i.e., device information) of device unit 150 connected to the printer 140, from the printer 140 and the device unit 150, respectively. Further, to be described later, when device information is changed, adjusted, or corrected, the printer controller 250 sets changed device information at the device unit 150.

(Configuration of Operation PC)

As shown in FIG. 2, the operation PC 120 may include a pre-press input processing unit 260, for example. The pre-press input processing unit 260 may be configured with a print-image display processing unit 261, and an input unit 262, for example.

The print-image display processing unit 261 displays a virtual print image, generated by the print-image generation processing unit 244 and transmitted to the operator PC 120, and device information of the device unit 150 on a screen of personal computer such as operation PC 120.

With such a configuration, in the print management system 100, an operator can check or confirm print-finished image condition before an actual printing is conducted by the printer 140, and differences of device information set to different device units 150 can be reported to the operator. Such device information may be punch-hole perforating position and/or staple-binding position in printed products, for example, but not limited thereto.

The input unit 262 may be used by the operator when to change printing conditions, wherein the operator may input given values or settings as printing conditions using the input unit 262. For example, based on a virtual print image and device information of the device unit 150 displayed on a screen by the print-image display processing unit 261, the operator may input correction values using the input unit 262 to change printing conditions such as image printing position of writing-image data, device information, or the like. As such, the input unit 262 can be used to input correction values to change printing conditions, as required.

In another configuration, the pre-press input processing unit 260 may be disposed in the print control server 110, in which the print control server 110 includes the print-image display processing unit 261, and the input unit 262. In such a case, the print-image display processing unit 261 and the input unit 262 may be included in the pre-press controller 240, for example.

(Processing Operation of Standard Printing Operation)

Figure 3:
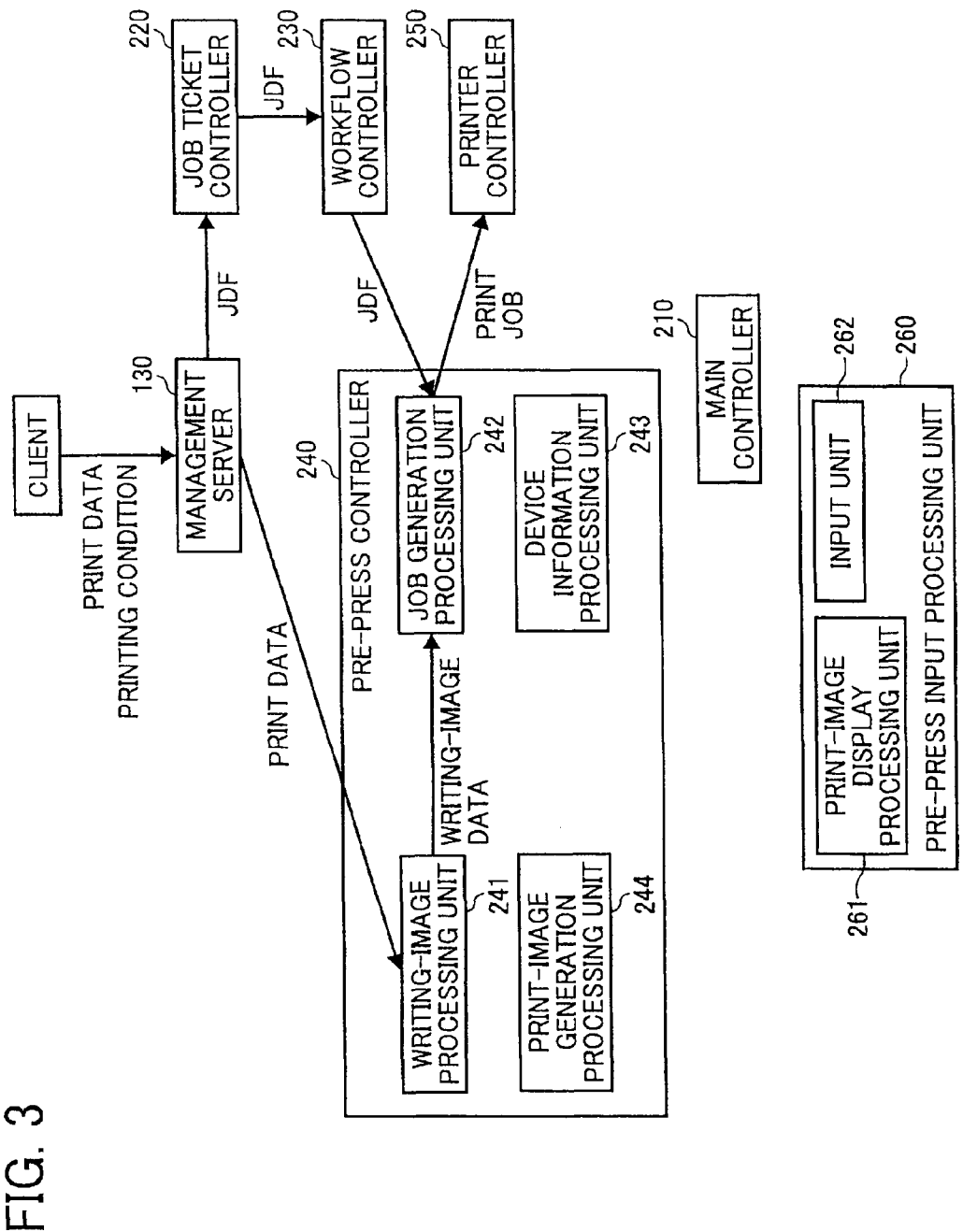
FIG. 3 illustrates an example block diagram of print management system, in which a single printer is used for a printing operation and flow of data is shown.
Figure 4:
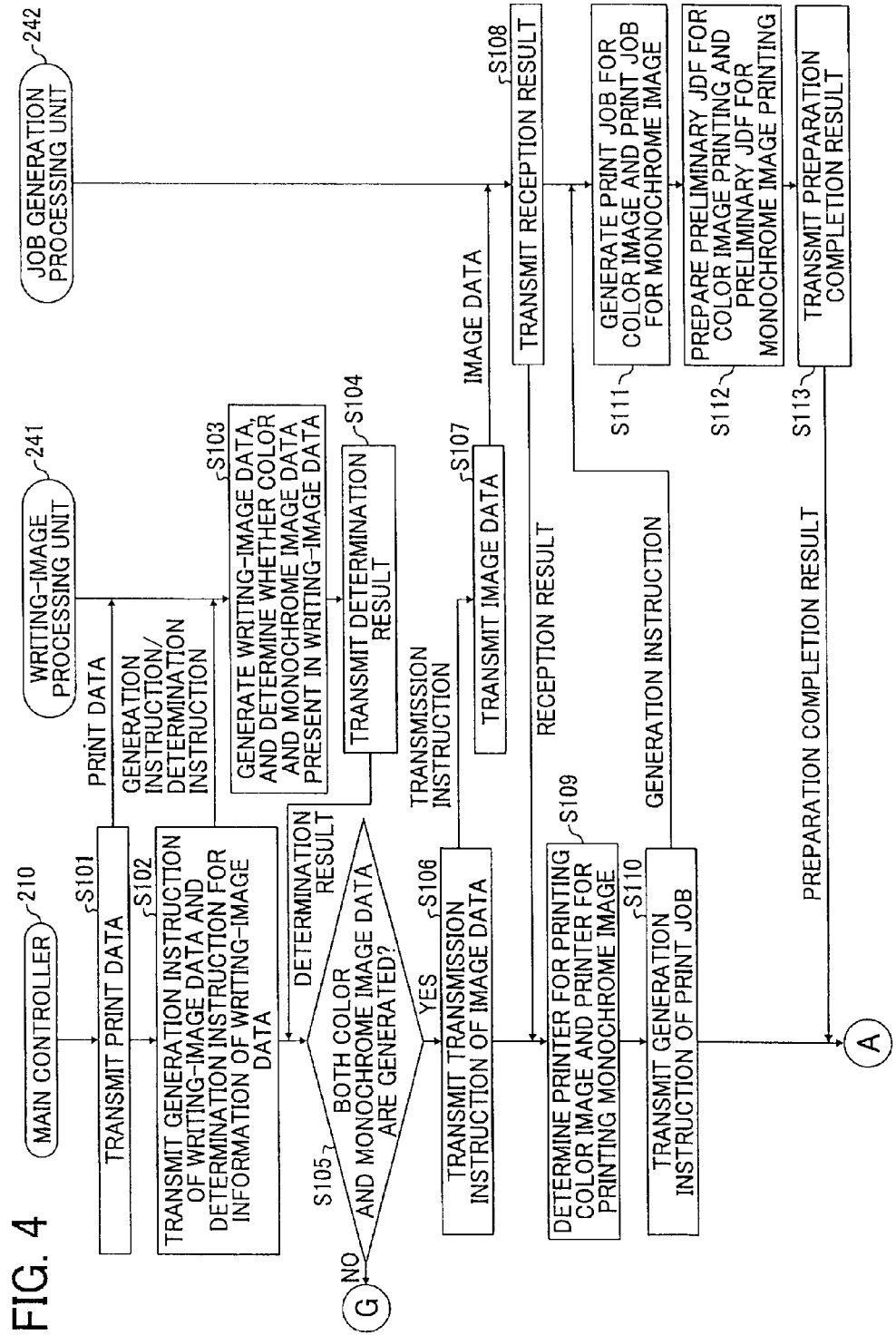
FIG. 4 illustrates an example flow of processing operation by a print system according to an example embodiment.
Figure 5:
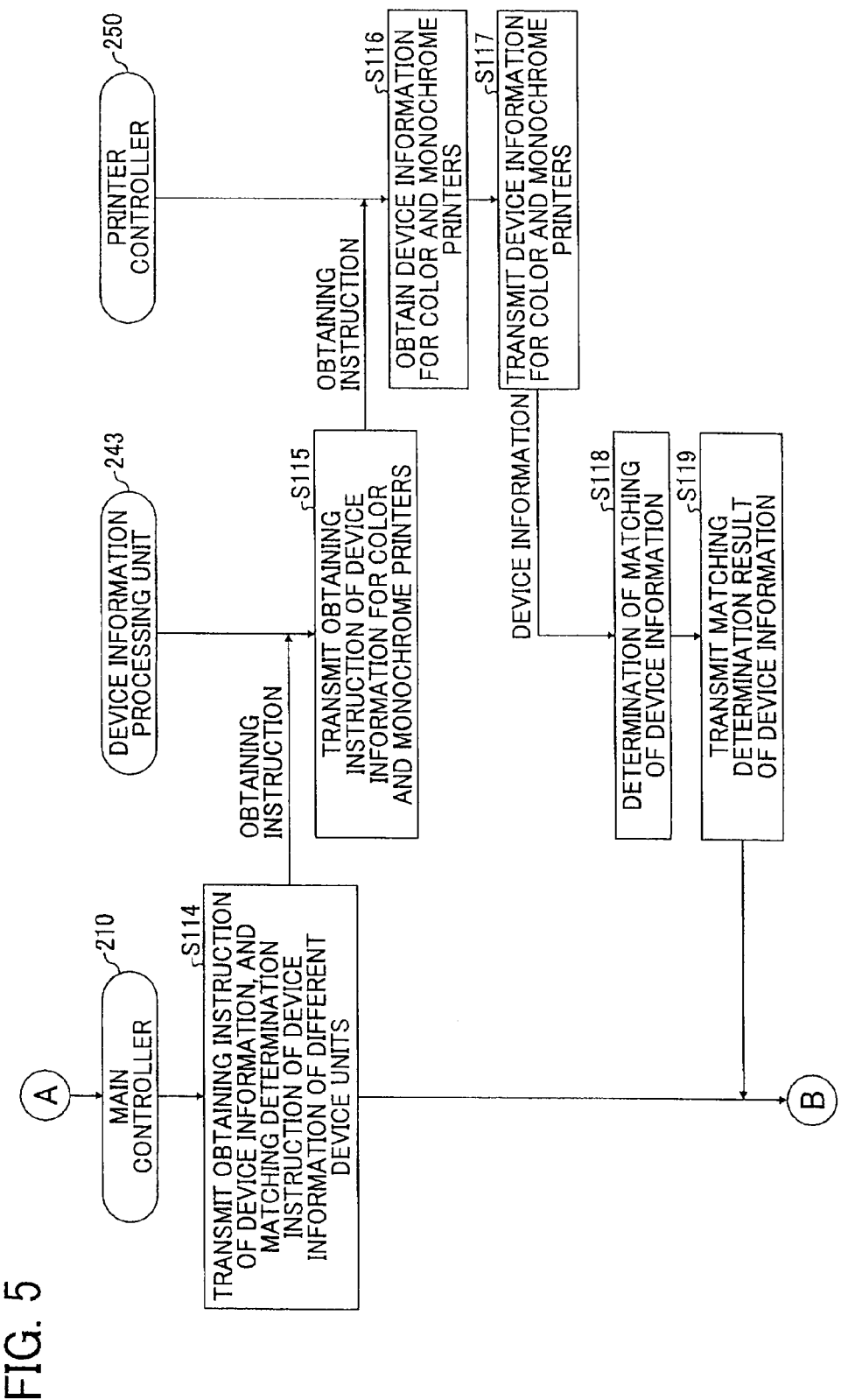
FIG. 5 illustrates an example flow of processing operation by a print system according to an example embodiment.
Figure 6:
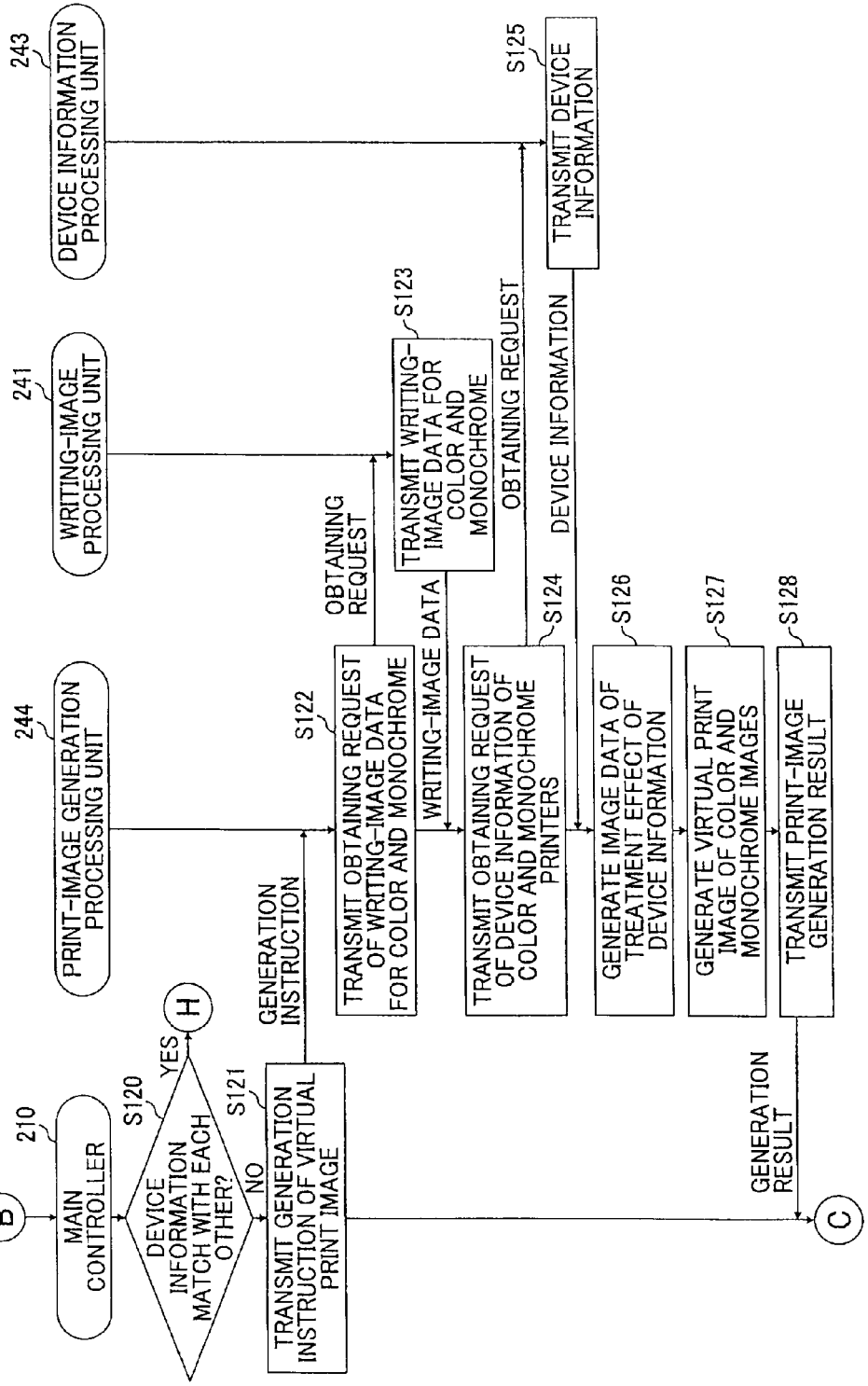
FIG. 6 illustrates an example flow of processing operation by a print system according to an example embodiment.

A description is now given to a standard printing operation using the print management system 200 with reference to FIG. 3, in which a single printer 140 may be used for a printing operation.

Upon receiving print data, to be printed, and printing condition instruction of the print data from a client, the management server 130 prepares a JDF based on the printing condition instruction. The printing condition instruction of client may designate conditions at each process step for printing. The JDF prepared by the management server 130 defines printing conditions at each process step for printing. Hereinafter, the print data may mean data transmitted from a client and to be printed using the printer 140.

Upon preparing the JDF, the management server 130 transmits the prepared JDF to the job ticket controller 220. Further, the management server 130 transmits the print data to the pre-press controller 240.

The job ticket controller 220 analyzes printing conditions set at each process step, defined in JDF transmitted from the management server 130. If it is determined that that the print management system 100 is capable of printing operation under the JDF-defined printing conditions based on an analysis result, the job ticket controller 220 transmits the JDF to the workflow controller 230, and instructs the workflow controller 230 to generate a workflow matched to the transmitted JDF-defined printing conditions.

Upon receiving such instruction for workflow generation from the job ticket controller 220, the workflow controller 230 generates a workflow by linking a plurality of process steps to be conducted in a given sequential order based on JDF-defined printing conditions transmitted from the job ticket controller 220. Such process steps may include a step of receiving print data, a step of producing print-finished products, for example.

Based on the generated workflow, the workflow controller 230 transmits the JDF and a pre-press process instruction to the pre-press controller 240. Further, based on the generated workflow, the workflow controller 230 transmits the JDF and a printer control instruction to the printer controller 250.

Upon receiving the print data from the management server 130, the writing-image processing unit 241 generates writing-image data.

The job generation processing unit 242 receives the JDF from the workflow controller 230, and converts a data format of writing-image data generated by the writing-image processing unit 241 to a data format that can be processed by the printer 140 to generate a print job.

Upon receiving the print job from the pre-press controller 240, the printer controller 250 controls the printer 140 based on the printer control instruction received from the workflow controller 230 so that the printer 140 prints the print job under the JDF-defined printing conditions.

The print management system 100 may conduct the standard printing operation as above described.

(Printing Operation Using a Plurality of Printers)

A description is now given to a printing operation using a plurality of printers 140 according to an example embodiment. When one print data is printed using a plurality of printers 140, device information of different device units 150 connected to the different printers 140 may be different with each other. For example, when the device unit 150 is used to perforate punch-holes in printed products, a punch-hole perforating position can be adjusted or changed to a given position by an adjustment work by an operator. In such a case, one device unit 150 may have reference device information of punch-hole position set at 20 mm from a left edge of sheet, and another device unit 150 may have other reference device information of punch-hole position set at 18 mm from a left edge of sheet, for example.

When a printing operation is conducted and then a post-printing process step is conducted using such device units 150, finished condition of print-finished products may become non-uniform condition among printed pages because of different condition settings of the printers 140 and device units 150. In view of such situation, in an example embodiment, before conducting a printing operation actually, a virtual print image including a treatment effect of post-printing process step can be displayed on a display unit such as screen, and values set for device information of device units can be changed using such display. With such a configuration, a desired print-finished product can be produced.

A description is now given to example processing operation conductable by the print management system 200 according to an example embodiment with reference to FIGS. 4 to 11. It should be noted that processing conducted by the management server 130, the job ticket controller 220, and the workflow controller 230 when the workflow controller 230 generates a workflow, and transmits a JDF to the pre-press controller 240 and the print controller 250 is same as the above described standard printing operation.

Upon receiving the print data from the management server 130, the main controller 210 transmits the print data to the writing-image processing unit 241 (step S101). After transmitting the data, the main controller 210 transmits a generation instruction of "writing-image data" and determination instruction for information of writing-image data to the writing-image processing unit 241 (step S102). At the step of determining information of writing-image data, it is determined whether the print data is composed of one kind of pages or a mixture of different kinds of pages. For example, it is determined whether the print data is composed of only color pages, only monochrome pages, or a mixture of color pages and monochrome pages. The color pages may be also referred to as color information or color image, and the monochrome pages may be also referred to as monochrome information or monochrome image. The term of monochrome page and monochrome pages, and the term of color page and color pages may be used interchangeably in this disclosure for the present invention.

The writing-image processing unit 241 generates writing-image data using the print data received from the main controller 210, and determines whether the writing-image data is a mixture of writing-image data for color and writing-image data for monochrome (step S103).

Figure 12:
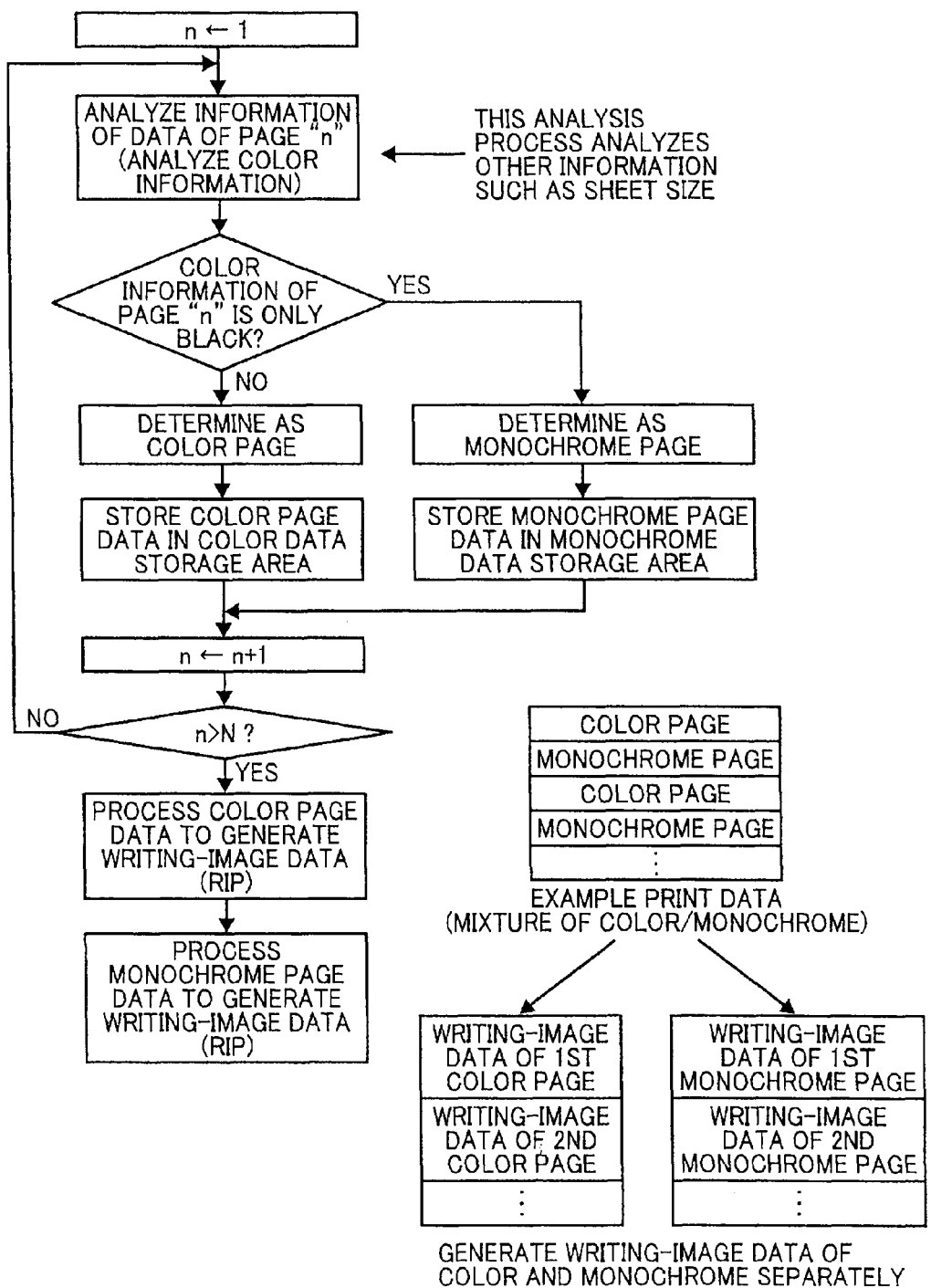
FIG. 12 illustrates an example flow of processing operation for generating writing-image data.

The writing-image processing unit 241 generates the writing-image data using given steps shown in FIG. 12, for example.

Specifically, the writing-image processing unit 241 separates print data page-by-page, analyzes color information in print data, and determines whether the print data includes color information. If it is determined that the print data includes color information, page data including color information is stored in a color data storage area, and page data not including color information is stored in a monochrome data storage area. As such, the data may be divided when the print data includes both color information and monochrome information, and then the divided data is stored in the color data storage area and monochrome data storage area.

When such determination process of writing-image data for one page is completed, page data of next page is checked to determine whether the next page includes color information. If the next page includes color information, the page data of next page is added after the page data already stored in the color data storage area. If the next page does not include color information, the page data of next page is added after the page data already stored in the monochrome data storage area. Such color information determination process is repeated until the last page of print data. With such processing, pages including color information (i.e., color page data) and pages not including color information (i.e., monochrome page data) can be separated and stored.

Then, the writing-image processing unit 241 conducts data processing to the color page data and monochrome page data to generate writing-image data for color pages and writing-image data for monochrome pages, respectively.

Based on a determination result of writing-image data information, the writing-image processing unit 241 may transmit one of following determination results to the main controller 210 (step S104). Such determination results may be "both of writing-image data for color pages and writing-image data for monochrome pages are generated", "only writing-image data for color pages is generated", or "only writing-image data for monochrome pages is generated", for example.

If the determination result of writing-image data information transmitted from the writing-image processing unit 241 is "both of writing-image data for color pages and writing-image data for monochrome pages are generated" (step S105: Yes), the main controller 210 transmits a transmission instruction to the writing-image processing unit 241, wherein the transmission instruction instructs a transmission of writing-image data for color pages and writing-image data for monochrome pages to the job generation processing unit 242 (step S106).

Upon receiving such transmission instruction, the writing-image processing unit 241 transmits the writing-image data for color pages and writing-image data for monochrome pages to the job generation processing unit 242 (step S107). Upon receiving such writing-image data for color pages and writing-image data for monochrome pages, the job generation processing unit 242 transmits a reception result to the main controller 210 (step S108).

Upon receiving such reception result, the main controller 210 determines which printer can be used to print the color pages and which printer can be used to print the monochrome pages by referring the print system management information retained in the main controller 210 (step S109). Then, the main controller 210 transmits a generation instruction of print job to the job generation processing unit 242, wherein such print job is to be transmitted to the determined printer 140 (step S110). When the generation instruction is transmitted as such, information designating the printer 140, determined to be used for printing operation, is also transmitted to the job generation processing unit 242.

Upon receiving the generation instruction of print job from the main controller 210, the job generation processing unit 242 respectively generates a print job for color pages and a print job for monochrome pages from the writing-image data for color pages and writing-image data for monochrome pages, transmitted from the writing-image processing unit 241 (step S111). The job generation processing unit 242 generates a print job suitably matched to the above-determined printer 140.

Figure 13:
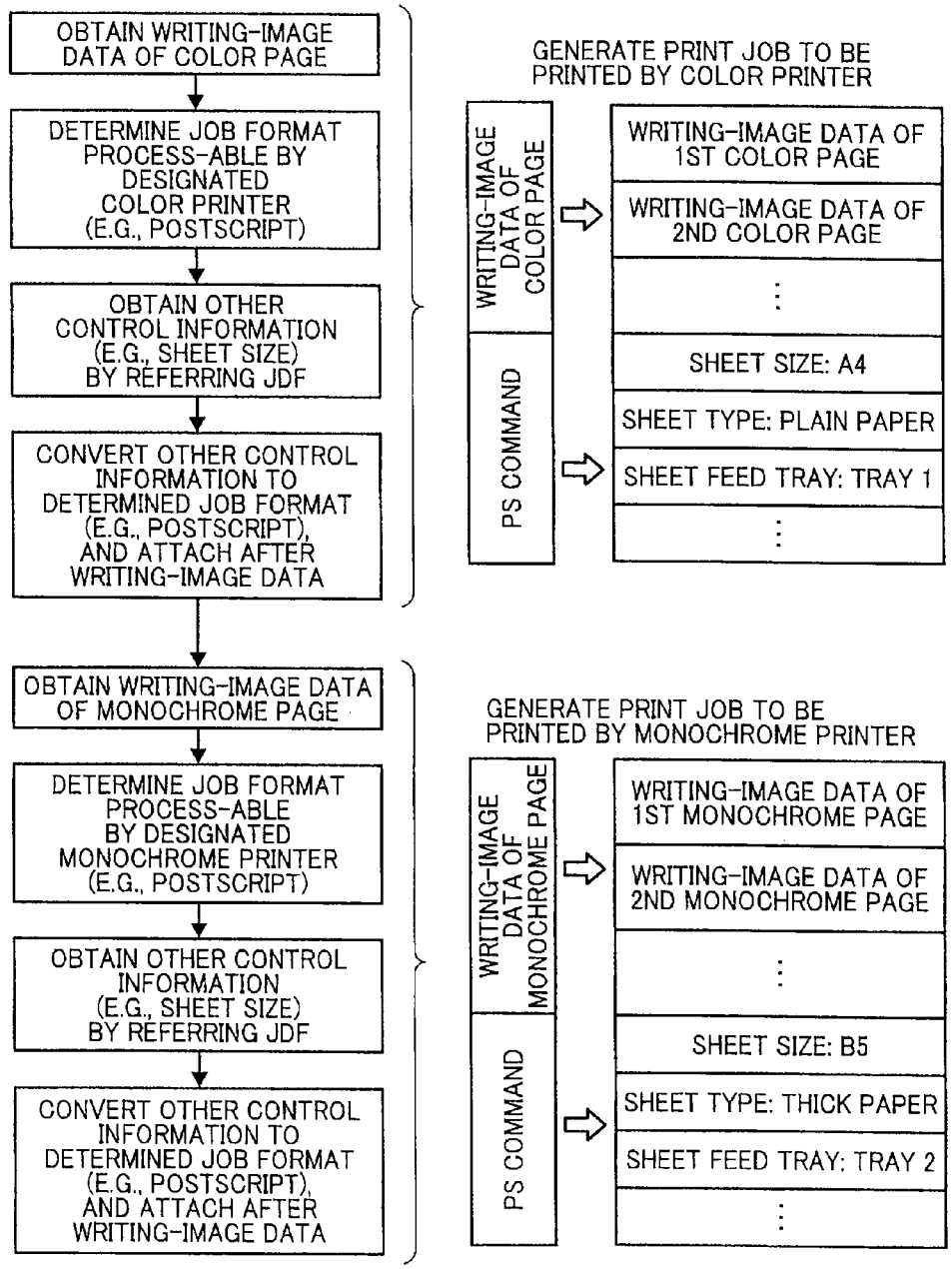
FIG. 13 illustrates an example flow of processing operation for generating a print job.

The job generation processing unit 242 generates a print job for color pages and a print job for monochrome pages using given steps shown in FIG. 13, for example.

The job generation processing unit 242 determines a job data format, which can be processed by the printer 140 that is to be used to print the color pages, wherein the main controller 210 determines the printer 140 for printing the color pages.

FIG. 13 shows example steps using one known job data format such as "PostScript (registered trademark)" which can be processed by the printer 140.

The job generation processing unit 242 analyzes print control information defined in the JDF received from the workflow controller 230 to determine the print control information. The print control information may mean information used for controlling a print operation such as "sheet size is A4", "sheet type is plain paper", "available sheet feed tray is tray 1", but not limited thereto.

After determining the print control information, the job generation processing unit 242 converts all of such determined print control information into PostScript format data, for example, and generates a string of commands of PostScript by linking the converted data. Then, the job generation processing unit 242 may generate a print job for color pages by linking the PostScript command (PS command) string after the writing-image data for color pages, transmitted from the writing-image processing unit 241, for example (In another case, the print job for color pages may be linked after the PostScript command string). A print job for monochrome pages can be generated in a same manner of generating the print job for color pages. If a job data format changes, the above described job data generation process also changes.

As such, in an example embodiment, two print jobs may be generated. Accordingly, two JDFs may be required to conduct a printing operation for each print job. Based on the JDF such as initial JDF received from the workflow controller 230, the job generation processing unit 242 prepares a preliminary JDF for color page printing and a preliminary JDF for monochrome image printing (step S112 of FIG. 4). The preliminary JDF for color page printing may not include all of printing conditions, but include information only for color printing. Further, the preliminary JDF for monochrome page printing may not include all of printing conditions, but include information only for monochrome printing. The information only for color printing may be "print mode is color", "printer information for color printing", for example. The information only for monochrome printing may be "print mode is monochrome", "printer information for monochrome printing", for example. Such information only for color printing or information only for monochrome printing may not include enough information to implement a printing operation defined as a workflow because a printing operation defined by a workflow needs all information included in an initial JDF, which defines printing conditions designated by a client. To be described later, the preliminary JDF for color page printing and preliminary JDF for monochrome page printing may be updated with information of the initial JDF in a later stage, to revise or re-prepare the JDF for generating a workflow for printing color pages and a workflow for printing monochrome image pages. Such revision or re-preparation of the JDF will be described in detail later. Since the preliminary JDF includes information only related to color or monochrome, the data amount of such preliminary JDF is smaller than that of the printing information required for conducting a printing operation defined in the initial JDF and therefore imposes less of a processing load on the system or apparatus when revising or re-preparing the preliminary JDF, compared to a case that a preliminary JDF is not prepared and all the print information required for conducting a printing operation is revised for re-preparing JDF.

After preparing the preliminary JDF for color page printing and the preliminary JDF for monochrome page printing, the job generation processing unit 242 transmits a preparation completion result, information of printer 140 for printing color pages, and information of printer 140 for printing monochrome pages to the main controller 210 (step S113).

The information of printer 140 may include a printer type name, internet protocol (IP) address, job data format processable by printer, for example. As such, the job generation processing unit 242 may retain a print job for color pages, a print job for monochrome pages, a preliminary JDF for color page printing, and a preliminary JDF for monochrome page printing.

While designating the printer 140 for printing color pages and the printer 140 for printing monochrome pages, the main controller 210 transmits an obtaining instruction for obtaining device information of device units 150 connected to the printers 140, and a determination instruction to the device information processing unit 243 (step S114 in FIG. 5), wherein the determination instruction instructs the device information processing unit 243 to determine whether the device information obtained from different device units 150 can be matched with each other.

Upon receiving such instruction from the main controller 210, the device information processing unit 243 transmits the obtaining instruction (or obtaining request) to the printer controller 250 to obtain device information of the device unit 150 connected to the printer 140 designated by the main controller 210 (step S115).

Upon receiving such obtaining instruction for device information, the printer controller 250 obtains device information of the device unit 150 connected to the printer 140 for printing color pages, and device information of the device unit 150 connected to the printer 140 for printing monochrome pages (step S116). The device information may be obtained by known methods. For example, device information can be obtained using an interface with the device unit 150, in which device information command is issued and a response to the command is used to obtain device information, or device information can be obtained using simple network management protocol (SNMP).

The printer controller 250 transmits the obtained device information to the device information processing unit 243 (step S117).

Upon receiving the device information from the printer controller 250, the device information processing unit 243 determines whether device information of the device unit 150 connected to the printer 140 for printing color pages and device information of the device unit 150 connected to the printer 140 for printing monochrome pages can be matched with each other (step S118). After such information matching determination step, the device information processing unit 243 transmits a matching determination result to the main controller 210 (step S119).

If the matching determination result received from the device information processing unit 243 indicates that two pieces of device information match with each other (step S120: Yes in FIG. 6), the main controller 210 proceeds the process to step S144, to be described later.

If the matching determination result received from the device information processing unit 243 indicates that two pieces of device information do match with each other (step S120: No in FIG. 6), the main controller 210 transmits a generation instruction of virtual print image to the print-image generation processing unit 244 (step S121).

Upon receiving the generation instruction of virtual print image, the print-image generation processing unit 244 transmits an obtaining request of writing-image data for color and writing-image data for monochrome to the writing-image processing unit 241 (step S122). Upon receiving such obtaining request, the writing-image processing unit 241 transmits the writing-image data of color pages and the writing-image data of monochrome pages, retained in the writing-image processing unit 241 to the print-image generation processing unit 244 (step S123).

Upon obtaining the writing-image data, the print-image generation processing unit 244 transmits an obtaining request to the device information processing unit 243, wherein such obtaining request instructs the device information processing unit 243 to obtain device information of the device unit 150 connected to the printer 140 designated for printing color pages and device information of the device unit 150 connected to the printer 140 designated for printing monochrome pages (step S124).

Upon receiving such obtaining request, the device information processing unit 243 transmits the device information of the device unit 150 connected to the printer 140 designated for printing color pages and the device information of the device unit 150 connected to the printer 140 designated for printing monochrome pages to the print-image generation processing unit 244 (step S125).

Upon obtaining the device information, based on the obtained two pieces of device information, the print-image generation processing unit 244 generates image data corresponding to device information in printing color pages and image data corresponding to device information in printing monochrome pages (step S126). As such, using the obtained device information, the print-image generation processing unit 244 generates image data of device unit 150 when each device unit 150 conducts a post-printing process. For example, when the device unit 150 perforates punch-hole having 10 mm diameter, the print-image generation processing unit 244 generates image data corresponding to 10 mm diameter punch-hole perforated on a print sheet. Such image data corresponding to device information may be an image showing an effect of treatment by the device unit 150.

Then, based on the preliminary JDF for color page printing, the print-image generation processing unit 244 adds the image data corresponding to device information to the writing-image data of color pages to generate a virtual print image of color pages. Further, based on the preliminary JDF for monochrome page printing, the print-image generation processing unit 244 adds the image data corresponding to device information to the writing-image data of monochrome pages to generate a virtual print image of monochrome pages (step S127). After generating the virtual print image, the print-image generation processing unit 244 transmits a print-image generation result to the main controller 210 (step S128).

Figure 7:
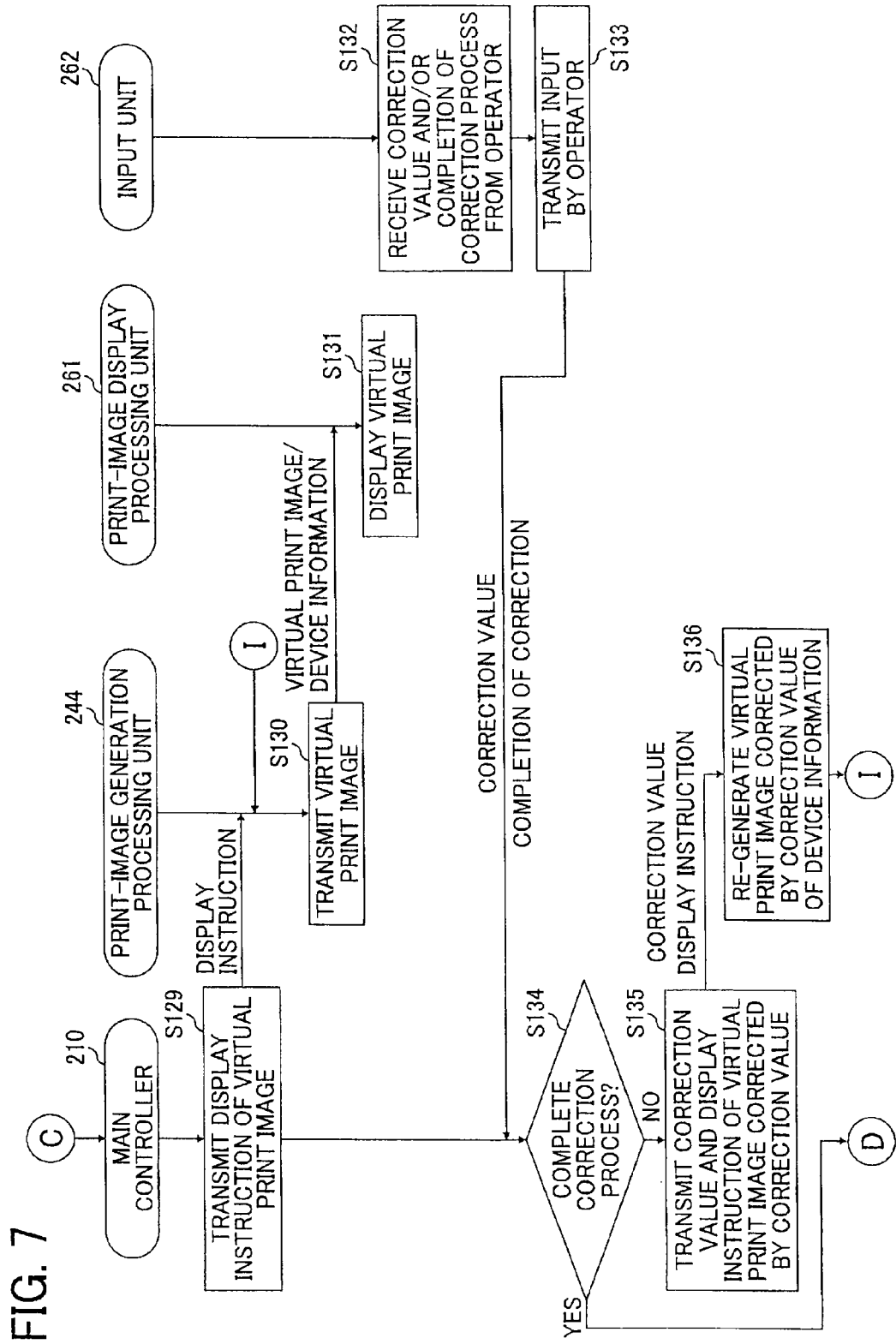
FIG. 7 illustrates an example flow of processing operation by a print system according to an example embodiment.
Figure 8:
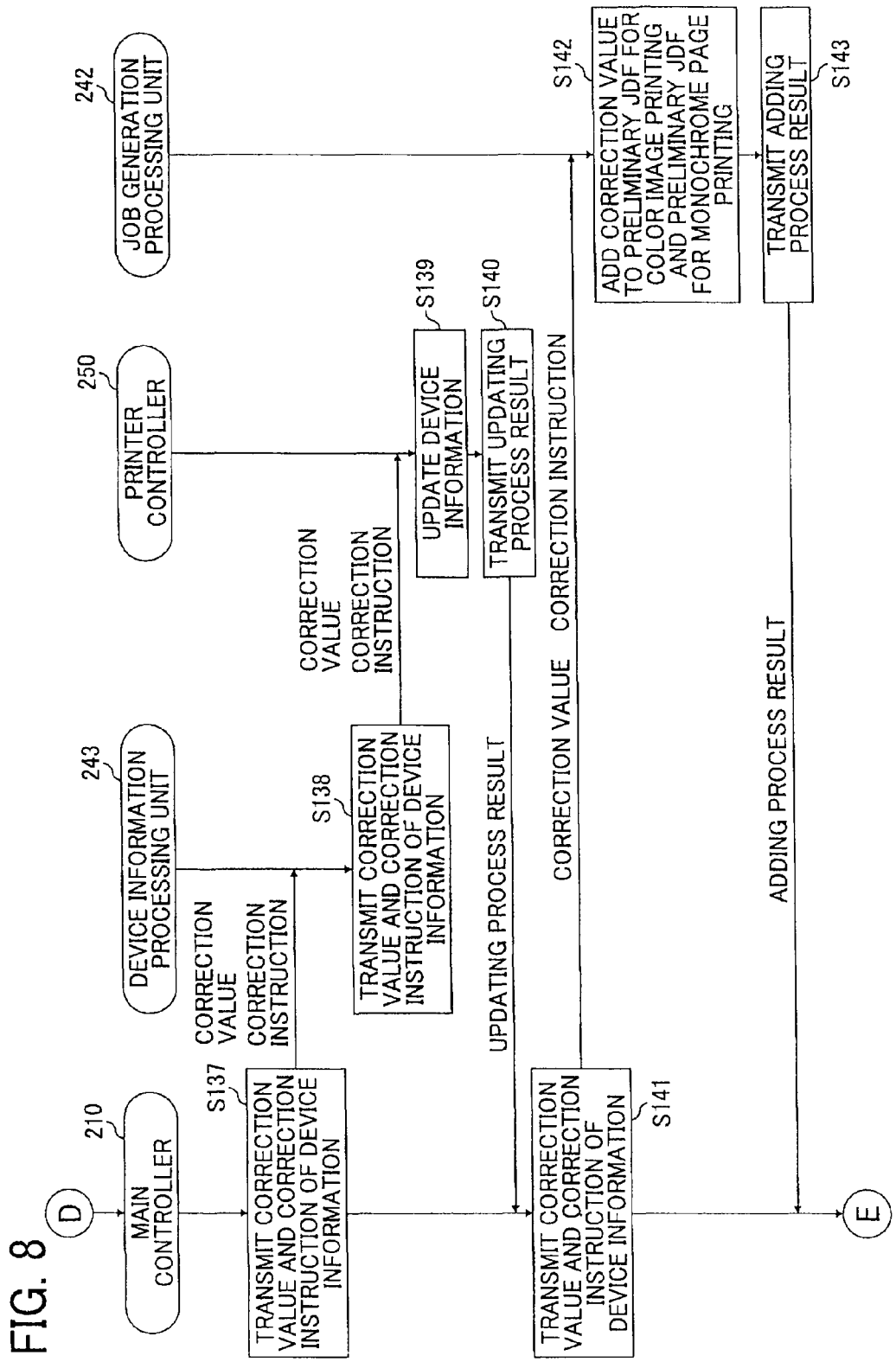
FIG. 8 illustrates an example flow of processing operation by a print system according to an example embodiment.

Upon receiving such print-image generation result, the main controller 210 transmits a display instruction of virtual print image to the print-image generation processing unit 244 (step S129 in FIG. 7). The print-image generation processing unit 244 transmits the virtual print image of color pages, the virtual print image of monochrome pages, and device information, retained therein, to the print-image display processing unit 261, and also transmits the display instruction to the print-image display processing unit 261 to display such virtual print image (step S130).

Upon receiving the display instruction, the print-image display processing unit 261 displays the obtained virtual print image and device information on a screen of the operation PC 120 (step S131). Such image data of virtual print image can be displayed on a screen by known methods. For example, an application having a screen display function may use a graphical user interface to display image data. For example, if the print control server 110 includes the print-image display processing unit 261 and the input unit 262, the print-image display processing unit 261 displays the virtual print image on a screen of print control server 110.

Figure 14:
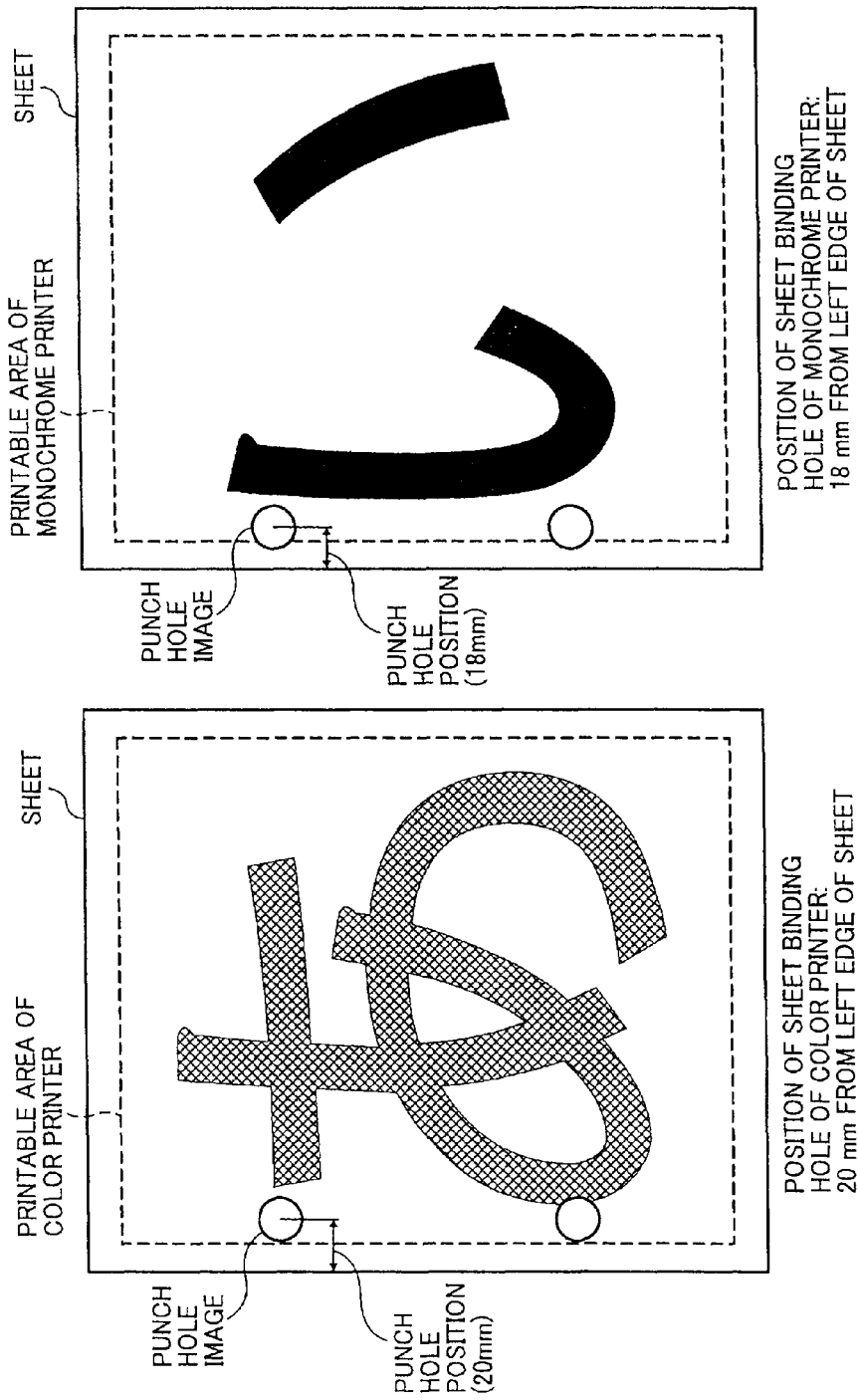
FIG. 14 illustrates an example display of virtual print image using a print system according to an example embodiment.

The virtual print image may be displayed on screen as shown in FIG. 14, for example, in which the first page of print product may be a color page, and the second page of print product may be a monochrome page. A client may designate printing conditions such as binding of print-finished product at a left side of sheets, and perforating of punch-holes for binding sheets at a post-printing process step.

As such, the print-image display processing unit 261 may display the virtual print image of color page data and the virtual print image of monochrome pages data simultaneously, by which differences of print conditions between color page and monochrome pages can be checked and/or confirmed. Further, an operator can check and/or confirm differences of printing conditions related to device information.

For example, in FIG. 14, a punch-hole perforating position in color page is set at 20 mm from a left edge of sheet, and a punch-hole perforating position in monochrome page is set at 18 mm from a left edge of sheet, for example. In such a case, device information of different device units 150 can be matched with each other by conducting any one of following corrections or adjustments: the punch-hole position in monochrome page is changed or re-set to 20 mm from a left edge of sheet, which is the punch-hole position set in color page, in which only the punch-hole position in monochrome page is corrected; the punch-hole position in color page is changed or re-set to 18 mm from a left edge of sheet, which is the punch-hole position set in monochrome page, in which only the punch-hole position in color page is corrected; or the punch-hole position in color page and the punch-hole position in monochrome page are both changed or re-set to other value such as 16 mm from a left edge of sheet, in which both the punch-hole position in color page and the punch-hole position in monochrome page are corrected. In the example embodiment, which correction is suitable can be determined by viewing the virtual print image.

In FIG. 14, a part of writing-image data on the first page is damaged at the perforating punch-hole. This may be caused by inadequate setting of punch-hole perforating position, or inadequate image printing position of writing-image data, for example.

In case of FIG. 14, two pieces of device information such as punch-hole perforating position can be matched with each other, or the punch-hole perforating position can be corrected to a given position to avoid damaging of writing-image data by inputting a correction value using the input unit 262. For example, an operator can input a correction value to avoid damaging of writing-image data while viewing the virtual print image displayed on a screen of the print-image display processing unit 261.

As such, the virtual print image having image data of device information can be displayed on a screen. After displaying the virtual print image and device information on the screen, an operator may input a correction value and an instruction of completion of correction step via the input unit 262. Upon receiving such input from the operator (step S132 in FIG. 7), the input unit 262 transmits the input by the operator to the main controller 210 (step S133). By using the input unit 262, the operator may input only a correction value for device information of device unit 150 connected to the printer 140 for printing color pages, only a correction value for device information of device unit 150 connected to the printer 140 for monochrome pages, or correction value for both device information of device units 150 for printing color and monochrome pages. Further, the operator may only input a completion of correction step using the input unit 262 if no correction process is required at step S132. As such, the operator may input correction values and/or the completion of correction instruction to the input unit 262 at step S132.

Upon receiving the input by the operator, the main controller 210 determines whether the input by the operator is a completion of correction step (step S134). If the input is not the completion of correction step (step S134: No), the main controller 210 transmits the correction value, input by the operator, and a display instruction to instruct a display of virtual print image, corrected by the correction value, to the print-image generation processing unit 244 (step S135).

Upon receiving the correction value and display instruction, the print-image generation processing unit 244 re-generates a correction-added virtual print image based on the correction value (step S136). Then, the print-image generation processing unit 244 conducts a process at step S130. With such a configuration, a virtual print image re-generated based on the correction value can be displayed by the print-image display processing unit 261 as correction-added virtual print image. The operator can still input another correction value for this correction step while viewing the virtual print image regenerated based on the correction value. Further, if a desired virtual print image is obtained by such correction step, the operator may input the completion of correction step.

Figure 15:
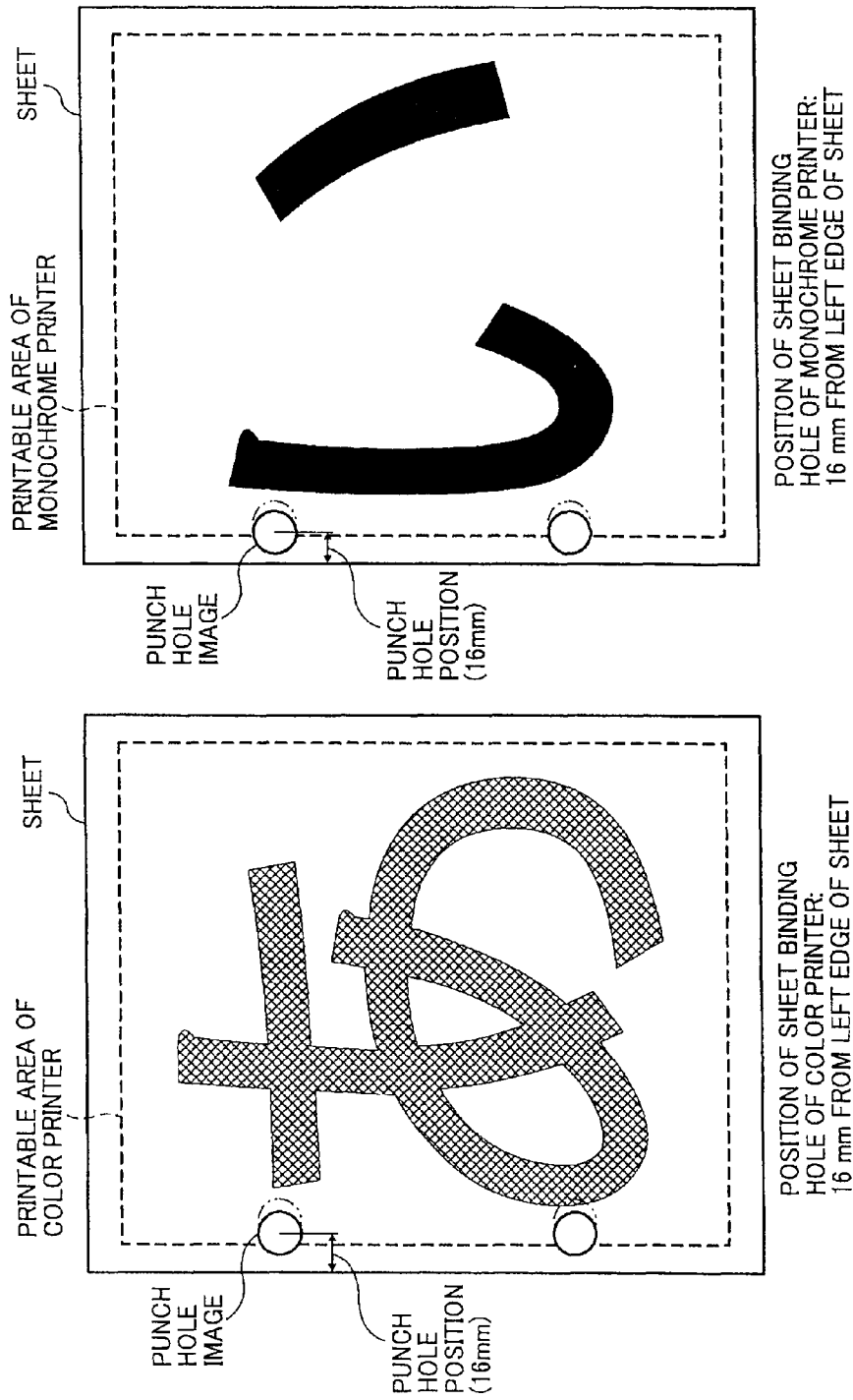
FIG. 15 illustrates an example display of virtual print image using a print system according to an example embodiment.

After such correction process, the virtual print image displayed on a screen as shown in FIG. 14 may be corrected to another virtual print image as shown in FIG. 15, for example.

In an example case of FIGS. 14 and 15, the operator inputs a correction value of 16 mm using the input unit 262 to correct both punch-hole position in color pages and a punch-hole position in monochrome pages, and then a virtual print image corrected by the correction value of 16 mm is generated as shown in FIG. 15. As for the color page in FIG. 15, a punch-hole position in color page is shifted toward a left edge of sheet by 4 mm from FIG. 14, by which damages by punch-hole on writing-image data can be prevented. Such numerical value of punch-hole position can be used as one piece of device information. With the above-described configuration, it can be confirmed that writing-image data can be output without damages by punch-hole before actually conducting a printing operation.

With such a configuration, when printing attribute of pages of print product is switched in the middle of print product, and the printers 140 may be required to be switched from one printer to another printer, difference of device information of different device units 150 connected to the different printers 140 can be reported to the operator, by which the operator can recognize such situation and can correct the device information, as required.

When the operator inputs the completion of correction step (step S134: Yes), the main controller 210 transmits a correction value of device information and a correction instruction of device information to the device information processing unit 243 (step S137 in FIG. 8). Upon receiving the correction value of device information and correction instruction of device information, the device information processing unit 243 transmits such received correction value of device information and correction instruction of device information to the printer controller 250 (step S138), wherein the correction instruction of device information may be also referred to as updating instruction of device information.

Upon receiving the correction value of device information and updating instruction of device information, the printer controller 250 updates device information of the device unit 150 (step S139). The device information can be updated by known methods. For example, device information can be updated by issuing a device information updating command based on an interface with the device unit 150, or device information can be updated using simple network management protocol (SNMP). Upon completing an updating process of device information, the printer controller 250 transmits an updating process result to the main controller 210 (step S140).

Upon receiving the updating process result, the main controller 210 transmits the correction value of device information and the correction instruction of device information to the job generation processing unit 242 (step S141).

Upon receiving the correction value of device information and the correction instruction of device information, the job generation processing unit 242 adds the correction value of device information of the device unit 150, connected to the printer 140 for printing color pages, to the retained preliminary JDF for color page printing, and adds the correction value of device information of device information of the device unit 150, connected to the printer 140 for printing monochrome pages, to the retained preliminary JDF for monochrome page printing (step S142). Upon completing an adding process of the correction value to the preliminary JDF, the job generation processing unit 242 transmits an adding process result to the main controller 210 (step S143).

Figure 9:
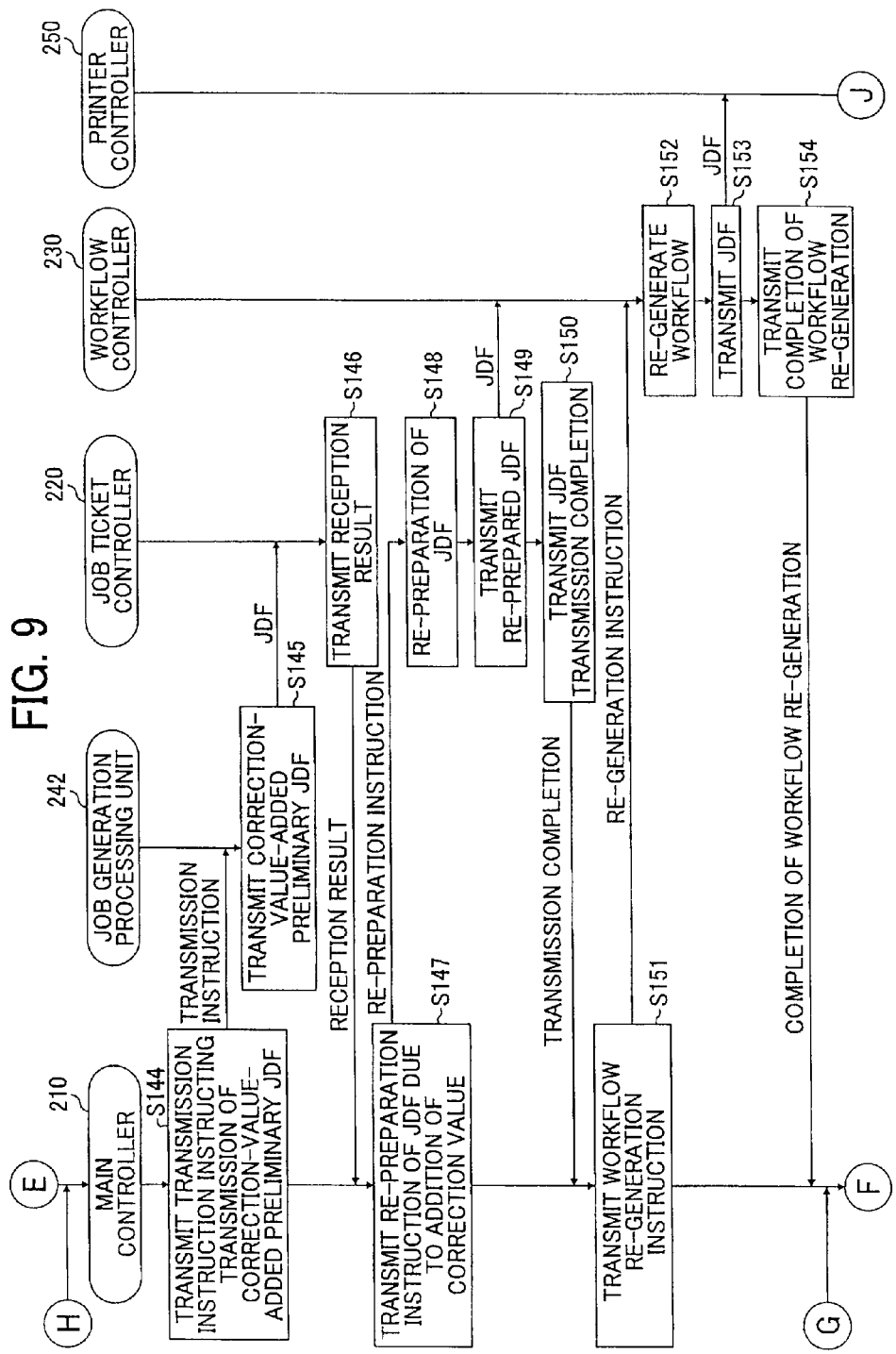
FIG. 9 illustrates an example flow of processing operation by a print system according to an example embodiment.

Upon receiving the adding process result, the main controller 210 transmits a transmission instruction to the job generation processing unit 242, wherein the transmission instruction instructs a transmission of correction-value-added preliminary JDF to the job ticket controller 220 (step S144 in FIG. 9). Upon receiving the transmission instruction, the job generation processing unit 242 transmits the correction-value-added preliminary JDF to the job ticket controller 220 (step S145). Upon receiving the correction-value-added preliminary JDF, the job ticket controller 220 transmits a reception result of the preliminary JDF to the main controller 210 (step S146).

Upon receiving the reception result of the preliminary JDF, the main controller 210 transmits a re-preparation instruction of JDF to the job ticket controller 220 (step S147). Upon receiving the re-preparation instruction of JDF, the job ticket controller 220 re-prepares a JDF based on the correction-value-added preliminary JDF received from the job generation processing unit 242. Specifically, the job ticket controller 220 re-prepares a JDF from an initial JDF, wherein the initial JDF is a JDF prepared from printing conditions designated by a client when the client sends print data to a printing company, and retained in the system (step S148).

FIG. 16 shows example steps for re-preparing or revising JDF by the job ticket controller 220, in which information defined in the correction-value-added preliminary JDF is added to the initial JDF to re-prepare a new JDF for color page printing and a new JDF for monochrome page printing.

The job ticket controller 220 may copy the initial JDF to prepare a new JDF for color page printing and a new JDF for monochrome page printing (step S201).

The job ticket controller 220 extracts all information defined in the correction-value-added preliminary JDF for color page printing received from the job generation processing unit 242 (step S202). In the example embodiment, such extracted information may be color printing information, which is prepared when the writing-image processing unit 241 generates the writing-image data of color pages and writing-image data of monochrome pages, and information of the correction value of device information of the device unit 150 connected to the printer 140 to be used for printing color pages, for example.

Then, the job ticket controller 220 updates information defined in the new JDF for color page printing by using the information extracted from the preliminary JDF for color page printing (step S203). Because information, not extracted from the preliminary JDF for color page printing, is not to be updated, such information retains same information (e.g., value) of printing conditions designated by the client when the print data is transmitted from the client.

Similar processes are conducted for the new JDF for monochrome page printing (steps S204 and S205) as similar to the new JDF for color page printing. Such updated JDF for color page printing and updated JDF for monochrome page printing may be used as re-prepared JDF. With such a re-preparation step by the job ticket controller 220, the updated JDF for color page printing is prepared as the new JDF used for print job of color pages, and the updated JDF for monochrome page printing is prepared as the new JDF used for print job of monochrome pages.

Upon completion of re-preparation of JDF, the job ticket controller 220 transmits such two re-prepared JDFs (or new JDFs) to the workflow controller 230 (step S149 in FIG. 9). After transmitting the re-prepared JDFs, the job ticket controller 220 transmits a JDF transmission completion report to the main controller 210 (step S150).

Upon receiving the completion report of JDF transmission, the main controller 210 transmits a workflow re-generation instruction to the workflow controller 230 (step S151). Upon receiving the workflow re-generation instruction, the workflow controller 230 re-generates a workflow (step S152). In an example embodiment, a print job may include two print jobs such as a print job for color pages and a print job for monochrome pages. Accordingly, the workflow controller 230 re-generates a workflow for printing color pages and a workflow for printing monochrome pages using a workflow re-generation step. After re-generating the workflow, the workflow controller 230 transmits the two JDFs, received from the job ticket controller 220, to the printer controller 250 (step S153). After transmitting the two JDFs, the workflow controller 230 transmits a completion of workflow re-generation step to the main controller 210 (step S154).

Figure 10:
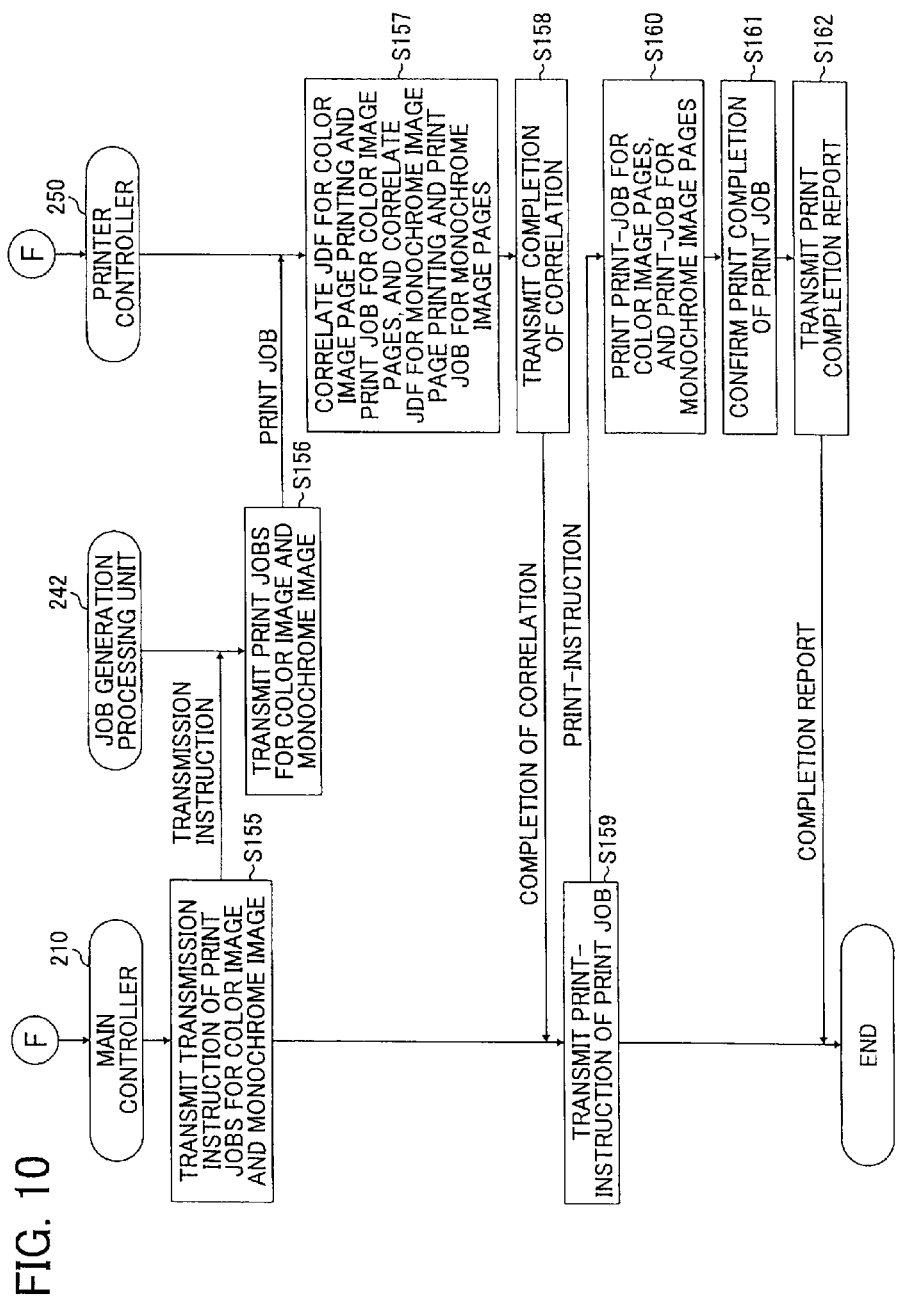
FIG. 10 illustrates an example flow of processing operation by a print system according to an example embodiment.
Figure 11:
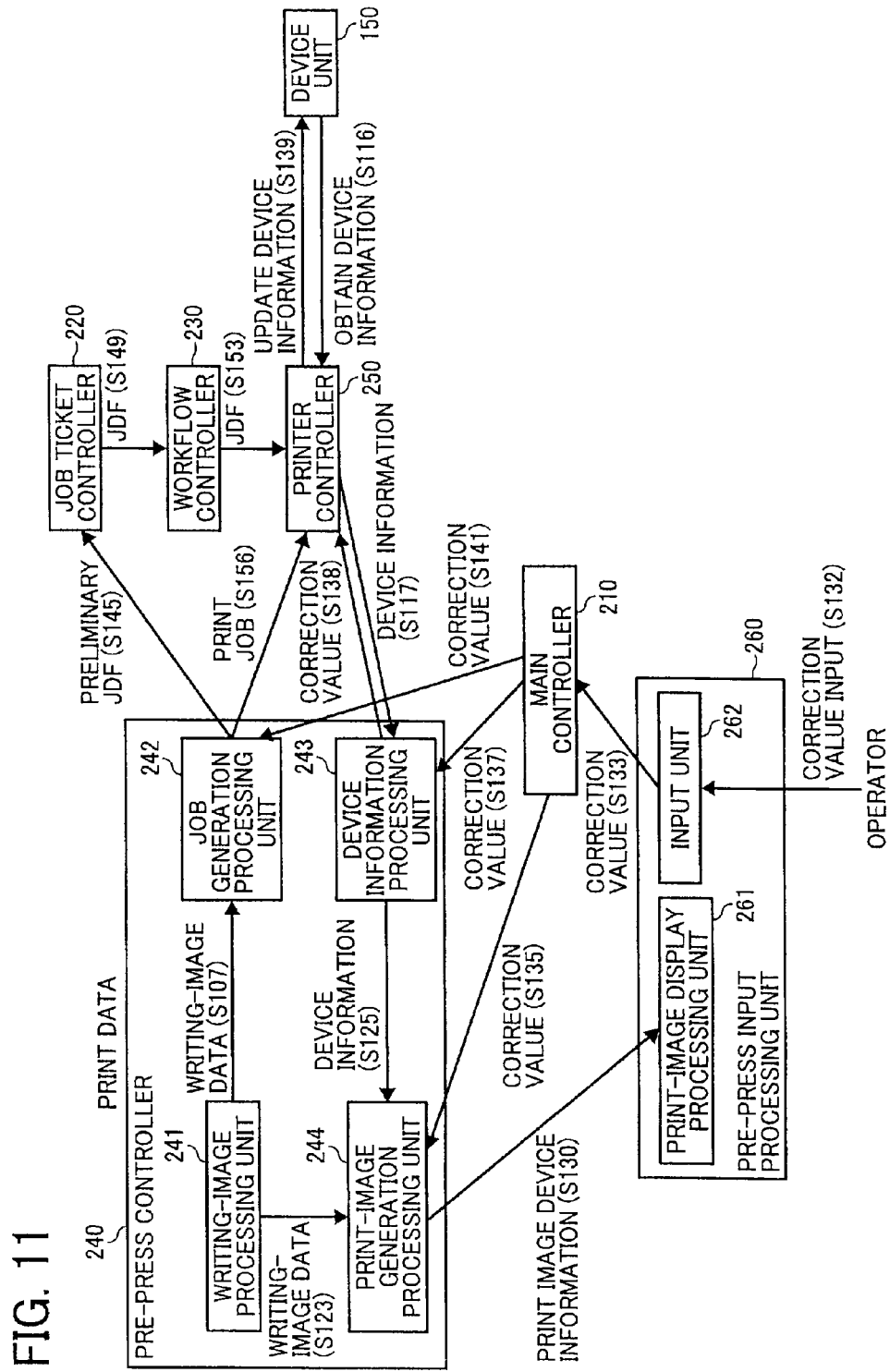
FIG. 11 illustrates an example block diagram of print management system according to an example embodiment, in which two printers are used for a printing operation and flow of data is shown.

Upon receiving the completion of the workflow re-generation process, the main controller 210 transmits a transmission instruction of print job for color pages and a print job for monochrome pages to the job generation processing unit 242 (step S155 in FIG. 10). Upon receiving the transmission instruction, the job generation processing unit 242 transmits the retained print job for color pages and print job for monochrome pages to the printer controller 250 (step S156).

Upon receiving the print job, the printer controller 250 correlates two JDFs received from the workflow controller 230 and two print jobs (step S157). Specifically, the printer controller 250 correlates the JDF for color page printing and the print job for color pages, and correlates the JDF for monochrome page printing and the print job for monochrome pages. With such a configuration, print control for color pages, and print control for monochrome pages can be conducted. After correlating the JDF and print job, the printer controller 250 transmits a completion of correlation step to the main controller 210 (step S158).

Upon receiving the completion of correlation step, the main controller 210 transmits a print-instruction of print job for color pages and a print-instruction of print job for monochrome pages to the printer controller 250 (step S159). Upon receiving the print-instruction, the printer controller 250 prints the retained print job for color pages using the printer 140 designated as a printer for printing the color pages, and prints the retained print job for monochrome pages using the printer 140 designated as a printer for printing the monochrome pages (step S160). Then, the printer controller 250 confirms a print completion of print jobs at each of the printers 140 (step S161), and after confirming the print completion, the printer controller 250 transmits a print completion report to the main controller 210 (step S162).

As such, in the example embodiment, when to-be-printed product is a mixture of color pages and monochrome pages, color pages can be printed by a multicolor-printing printer, and monochrome pages can be printed by a monochrome-printing-only printer. Further, in the example embodiment, even if one print product is printed by using two or more printers 140 and device units 150, finished condition of print-finished products may have no differences page-by-page. Such printing configuration can be provided as a print management apparatus, a print management system, and a print management method.

In the above described example embodiment, each steps for printing and other operation can be implemented using hardware or software, or a combination of hardware and software.

When software is used to conduct the above described process, a program recording a given process sequences may be read from a read only memory (ROM) storing the program, and written on a memory of computer, which may be integrated in a specific hardware such as random access memory (RAM) to execute the program, or a program may be installed in a general-purpose computer, which can conduct various processes to execute program.

As such, computer-readable program can be stored in a recording medium such as hard disc, ROM, or the like. Further, computer-readable program can be stored in a removable recording medium such as magnetic disc (e.g., flexible disc), optical disc (e.g., compact disc, digital versatile disc), magneto optical disc (MO) temporarily or permanently. Such removable recording medium may be available as package software. Further, computer-readable program can be installed to a computer from such removable recording medium, or can be downloaded from a download site via a network. For example, program can be transmitted to a computer from a download site using wired or wireless communication via a network such as local area network (LAN), the Internet, or the like, and such downloaded program can be installed in a recording medium such as hard disc in the computer. As such, in the above-described exemplary embodiment, a computer can be used with a computer-readable program to control functional units, devices, or the like used for conducting the above described process as an print management apparatus, a print management system, and a print management method. For example, a particular computer (e.g., personal computer, work station) may control the print system or apparatus using a computer-readable program, which can execute the above-described processes or steps. Further, in the above-described exemplary embodiment, a storage device (or recording medium), which can store computer-readable program, may be a flexible disc, a compact disc read only memory (CD-ROM), a digital versatile disc read only memory (DVD-ROM), DVD recording only/rewritable (DVD-R/RW), a memory card, a memory chip, a mini disc (MD), a magneto optical disc (MO), magnetic tape, hard disc in a server, or the like, but not limited these. Further, a computer-readable program can be downloaded to a particular computer (e.g., personal computer) via a network such as the Internet, or a computer-readable program can be installed to a particular computer from the above-mentioned storage device, by which the particular computer may be used for the print system or apparatus according to exemplary embodiments, for example.

Further, in the above-described exemplary embodiment, the process may be conducted with a time sequence manner, the process may be conducted with a parallel manner, or each step of process may be conducted with a discrete manner, as required, while in view of processing capacity of apparatus or system.

Further, in the above-described example embodiment, a print management system can be configured with a plurality of apparatuses or machines combined in a logical manner, or can be configured with a mixture of functions of apparatuses or machines.

Further, in the above-described example embodiment, a print management apparatus may further include a printer controller, a print-image generation processing unit, and a print-image display processing unit. The printer controller obtains first device information of a first device unit connected to a first printer for printing the color page, and second device information of a second device unit connected to a second printer for printing the monochrome page. The print-image generation processing unit generates device-treatment-effect-included image data having a treatment effect of the first device unit and device-treatment-effect-included image data having a treatment effect of the second device unit when the first device information and the second device information do not match with each other. The print-image generation processing unit adds the device-treatment-effect-included image data having the treatment effect of the first device unit to the writing-image data of the color page, and adds the device-treatment-effect-included image data having the treatment effect of the second device unit to the writing-image data for the monochrome page to generate a virtual print image of the print data based on the preliminary job ticket for printing the color page and the preliminary job ticket for printing the monochrome page. The print-image display processing unit displays the virtual print image generated by the print-image generation processing unit. Further, in the above-described example embodiment, the print management apparatus may further include an input unit. The input unit is used to input a correction value for the first device information and a correction value for the second device information, and the print-image generation processing unit re-generates the virtual print image corrected by the correction value when the correction value is input via the input unit. Further, in the above-described example embodiment, the print management apparatus may further include a job ticket controller. The job ticket controller prepares a job ticket for printing the color page based on the initial job ticket set for the print data and the preliminary job ticket for printing the color page, and prepares a job ticket for printing the monochrome page based on the initial job ticket set for the print data and the preliminary job ticket for printing the monochrome page. The printer controller updates at least one of the first device information and the second device information based on the correction value when the correction value is input via the input unit. The job generation processing unit updates at least one of the preliminary job ticket for printing the color page and the preliminary job ticket for printing the monochrome page based on the correction value when the correction value is input via the input unit. The job ticket controller prepares a job ticket for printing the color page based on the initial job ticket of print data and the updated preliminary job ticket for printing the color page when the correction value is input via the input unit. The job ticket controller prepares a job ticket for printing the monochrome image based on the initial job ticket of print data and the updated preliminary job ticket for printing the monochrome page when the correction value is input via the input unit.

Further, in the above-described example embodiment, the print management apparatus may further include a workflow controller. The workflow controller generates a workflow for the color page based on the job ticket for printing the color page prepared by the job ticket controller, and generates a workflow for the monochrome page based on the job ticket for printing the monochrome page prepared by the job ticket controller.

Further, in the above-described example embodiment, a print management system may include a printer controller and a pre-press controller. The printer controller obtains first device information of a first device unit connected to a first printer for printing the color page, and second device information of a second device unit connected to a second printer for printing the monochrome page. The pre-press controller includes a print-image generation processing unit and a print-image display processing unit. The print-image generation processing unit generates device-treatment-effect-included image data having a treatment effect of the first device unit and device-treatment-effect-included image data having a treatment effect of the second device unit when the first device information and the second device information do not match. The print-image generation processing unit adds the device-treatment-effect-included image data having a treatment effect of the first device unit to the writing-image data of the color page, and adds the device-treatment-effect-included image data having a treatment effect of the second device unit to the writing-image data for the monochrome page to generate a virtual print image of the print data based on the preliminary job ticket for printing the color page and the preliminary job ticket for printing the monochrome page. The print-image display processing unit displays the virtual print image generated by the print-image generation processing unit.

Further, in the above-described example embodiment, in the print management system, the pre-press controller includes an input unit used to input a correction value for the first device information and a correction value for the second device information. The print-image generation processing unit re-generates the virtual print image corrected by the correction value when the correction value is input via the input unit.

Further, in the above-described example embodiment, in the print management system, the printer controller updates at least one of the first device information and the second device information based on the correction value when the correction value is input via the input unit. The job generation processing unit updates at least one of the preliminary job ticket for printing the color page and the preliminary job ticket for printing the monochrome page based on the correction value when the correction value is input via the input unit. The job ticket controller prepares a job ticket for printing the color page based on the initial job ticket of print data and the updated preliminary job ticket for printing the color page when the correction value is input via the input unit. The job ticket controller prepares a job ticket for printing the monochrome page based on the initial job ticket of print data and the updated preliminary job ticket for printing the monochrome page when the correction value is input via the input unit 262.

Further, in the above-described example embodiment, in the print management system, the workflow controller generates a workflow for the color page based on the job ticket for printing the color page prepared by the job ticket controller, and generates a workflow for the monochrome image page based on the job ticket for printing the monochrome page prepared by the job ticket controller.

Further, in the above-described example embodiment, a print management method further includes printer controlling step, print image generation processing step, and print-image display processing step. The printer controlling step obtains first device information of a first device unit connected to a first printer for printing the color page, and second device information of a second device unit connected to a second printer for printing the monochrome page. The print image generation processing step generates device-treatment-effect-included image data having a treatment effect of the first device unit and device-treatment-effect-included image data having a treatment effect of the second device unit when the first device information and the second device information do not match. The print image generation processing step adds the device-treatment-effect-included image data having a treatment effect of the first device unit to the writing-image data of the color page, and adds the device-treatment-effect-included image data having the treatment effect of the second device unit to the writing-image data for monochrome page to generate a virtual print image of the print data based on the preliminary job ticket for printing the color page and the preliminary job ticket for printing the monochrome page for generating a virtual print image of the print data. The print-image display processing step displays the virtual print image generated at the print image generation processing step.

Further, in the above-described example embodiment, the print management method may further include inputting step for inputting a correction value for the first device information and a correction value for the second device information, and the print image generation processing step re-generates the virtual print image corrected by the correction value when the correction value is input at the inputting step.

Further, in the above-described example embodiment, the print management method may further include job ticket controlling step. The job ticket controlling step prepares a job ticket for printing the color page based on the initial job ticket set for the print data and the preliminary job ticket for printing the color page, and prepares a job ticket for printing the monochrome page based on the job ticket of the print data and the preliminary job ticket for printing the monochrome page. The printer controlling step updates at least one of the first device information and the second device information based on the correction value the when the correction value is input at the inputting step. The job generation processing step updates at least one of the preliminary job ticket for printing the color page and the preliminary job ticket for printing the monochrome page based on the correction value when correction value is input at the inputting step. The job ticket controlling step prepares a job ticket for printing the color page based on the initial job ticket of print data and the updated preliminary job ticket for printing the color page when the correction value is input at the inputting step. The job ticket controlling step prepares a job ticket for printing the monochrome page based on the initial job ticket of print data and the updated preliminary job ticket for printing the monochrome page when the correction value is input at the inputting step.

Further, in the above-described example embodiment, the print management method may further include workflow generation step. The workflow generation step generates a workflow for the color page based on the job ticket for printing the color page prepared by the job ticket controlling step and generates a workflow for the monochrome page based on the job ticket for printing the monochrome page prepared by the job ticket controlling step.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A print management apparatus comprising:
a controller;
a writing-image processing unit to determine whether print data, to be printed using the print management apparatus, includes both color page and monochrome page, and to generate writing-image data of the color page and writing-image data of the monochrome page from the print data;
a job generation processing unit to prepare a preliminary job ticket for printing the color page and a preliminary job ticket for printing the monochrome page based on an initial job ticket set for the print data when the writing-image processing unit determines that the writing-image data includes both color page and monochrome page;
a printer controller to obtain first device information of a first device unit connected to a first printer for printing the color page and second device information of a second device unit connected to a second printer for printing the monochrome page; and
a print-image generation processing unit to generate device-treatment-effect-included image data having a treatment effect of the first device unit and device-treatment-effect-included image data having a treatment effect of the second device unit when the first device information and the second device information do not match,
the print-image generation processing unit adding the device-treatment-effect-included image data having the treatment effect of the first device unit to the writing-image data of the color page, and adding the device-treatment-effect-included image data having the treatment effect of the second device unit to the writing-image data for the monochrome page, to generate a virtual print image of the print data based on the preliminary job ticket for printing the color page and the preliminary job ticket for printing the monochrome page; and
a print-image display processing unit to display the virtual print image generated by the print-image generation processing unit.

2. The print management apparatus of claim 1, further comprising an input unit used to input a correction value for the first device information and a correction value for the second device information,
wherein the print-image generation processing unit re-generates the virtual print image as corrected by the correction value when the correction value is input via the input unit.

3. The print management apparatus of claim 2, further comprising a job ticket controller to prepare a job ticket for printing the color page based on the initial job ticket set for the print data and the preliminary job ticket for printing the color page, and to prepare a job ticket for printing the monochrome page based on the initial job ticket set for the print data and the preliminary job ticket for printing the monochrome page,
wherein the printer controller updates at least one of the first device information and the second device information based on the correction value when the correction value is input via the input unit, the job generation processing unit updates at least one of the preliminary job ticket for printing the color page and the preliminary job ticket for printing the monochrome page based on the correction value when the correction value is input via the input unit, the job ticket controller prepares a job ticket for printing the color page based on the initial job ticket of print data and the updated preliminary job ticket for printing the color page, and prepares a job ticket for printing the monochrome page based on the initial job ticket of print data and the updated preliminary job ticket for printing the monochrome page when the correction value is input via the input unit.

4. The print management apparatus of claim 3, further comprising a workflow controller to generate a workflow for the color page based on the job ticket for printing the color page prepared by the job ticket controller and a workflow for the monochrome page based on the job ticket for printing the monochrome page prepared by the job ticket controller.

5. A print management system, comprising:
a job ticket controller;
a workflow controller;
a pre-press controller; and
a printer controller to communicate information from the job ticket controller, the workflow controller, and the pre-press controller to control the print management system,
the job ticket controller preparing a job ticket of print data, to be printed using the print management system,
the pre-press controller including:
a writing-image processing unit to determine whether the print data includes both of color page and monochrome page, and to generate writing-image data of the color page and writing-image data of the monochrome page from the print data; and
a job generation processing unit to prepare a preliminary job ticket for printing the color page and a preliminary job ticket for printing the monochrome page based on an initial job ticket set for the print data when the writing-image processing unit determines that the writing-image data includes both of the color page and the monochrome page,
wherein the printer controller obtains first device information of a first device unit connected to a first printer for printing the color page and second device information of a second device unit connected to a second printer for printing the monochrome page,
the pre-press controller further including:
a print-image generation processing unit to generate device-treatment-effect-included image data having a treatment effect of the first device unit and device-treatment-effect-included image data having a treatment effect of the second device unit when the first device information and the second device information do not match,
the print-image generation processing unit adding the device-treatment-effect-included image data having a treatment effect of the first device unit to the writing-image data of the color page and adding the device-treatment-effect-included image data having a treatment effect of the second device unit to the writing-image data for the monochrome page to generate a virtual print image of the print data based on the preliminary job ticket for printing the color page and the preliminary job ticket for printing the monochrome page; and a print-image display processing unit to display the virtual print image generated by the print-image generation processing unit.

6. The print management system of claim 5, wherein the pre-press controller further including an input unit used to input a correction value for the first device information and a correction value for the second device information,
wherein the print-image generation processing unit re-generates the virtual print image corrected by the correction value when the correction value is input via the input unit.

7. The print management system claim 6, wherein the printer controller updates at least one of the first device information and the second device information based on the correction value when the correction value is input via the input unit,
the job generation processing unit updates at least one of the preliminary job ticket for printing the color page and the preliminary job ticket for printing the monochrome page based on the correction value when the correction value is input via the input unit, and
the job ticket controller prepares a job ticket for printing the color page based on the initial job ticket of print data and the updated preliminary job ticket for printing the color page, and prepares a job ticket for printing the monochrome page based on the initial job ticket of print data and the updated preliminary job ticket for printing the monochrome page when the correction value is input via the input unit.

8. The print management system claim 7, wherein the workflow controller generates a workflow for the color page based on the job ticket for printing the color page prepared by the job ticket controller and a workflow for the monochrome page based on the job ticket for printing the monochrome page prepared by the job ticket controller.

9. A print management method, comprising the steps of:
writing-image processing for determining whether print data, to be printed using the print management method, includes both of color page and monochrome page, and generating writing-image data of the color page and writing-image data of the monochrome page from the print data; and
job generation processing for preparing a preliminary job ticket for printing the color page and a preliminary job ticket for printing the monochrome page based on an initial job ticket set for the print data when the writing-image processing step determines that the writing-image data includes both of color page and monochrome page;
obtaining first device information of a first device unit connected to a first printer for printing the color page and second device information of a second device unit connected to a second printer for printing the monochrome page;
generating device-treatment-effect-included image data having a treatment effect of the first device unit and device-treatment-effect-included image data having a treatment effect of the second device unit when the first device information and the second device information do not match;
generating a virtual print image of the print data based on the preliminary job ticket for printing the color page and the preliminary job ticket for printing the monochrome page by adding the device-treatment-effect-included image data having a treatment effect of the first device unit to the writing-image data of the color page, and adding the device-treatment-effect-included image data having the treatment effect of the second device unit to the writing-image data of the monochrome page; and displaying the virtual print image generated at the print image generation processing step.

10. The print management method of claim 9, further comprising the step of:

inputting a correction value for the first device information and a correction value for the second device information, wherein the step of generating device-treatment-effect-included image data re-generates the virtual print image corrected by the correction value when the correction value is input at the inputting step.

11. The print management method of claim 10, further comprising the step of:

preparing a job ticket for printing the color page based on the initial job ticket set for the print data and the preliminary job ticket for printing the color page, and preparing a job ticket for printing the monochrome page based on the job ticket of the print data and the preliminary job ticket for printing the monochrome page, wherein the step of obtaining device information updates at least one of the first device information and the second device information based on the correction value the when the correction value is input at the inputting step, the job generation processing step updates at least one of the preliminary job ticket for printing the color page and the preliminary job ticket for printing the monochrome page based on the correction value when the correction value is input at the inputting step, and the step of preparing a job ticket for printing prepares a job ticket for printing the color page based on the initial job ticket of print data and the updated preliminary job ticket for printing the color page, and prepares a job ticket for printing the monochrome page based on the initial job ticket of print data and the updated preliminary job ticket for printing the monochrome page when the correction value is input at the inputting step.

12. The print management method of claim 11, further comprising the step of:

generating a workflow for the color page based on the job ticket for printing the color page prepared in the step of preparing a job ticket for printing and generating a workflow for the monochrome page based on the job ticket for printing the monochrome page prepared in the step of preparing a job ticket.

* * * * *